United States Patent
Mun et al.

(10) Patent No.: US 10,158,515 B2
(45) Date of Patent: Dec. 18, 2018

(54) APPARATUS AND METHOD FOR SENDING AND RECEIVING BROADCAST SIGNALS

(71) Applicant: LG ELECTRONICS INC., Seoul (KR)

(72) Inventors: Chulkyu Mun, Seoul (KR); Byounggill Kim, Seoul (KR); Jaehyung Kim, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/477,371

(22) Filed: Apr. 3, 2017

(65) Prior Publication Data

US 2017/0207942 A1 Jul. 20, 2017

Related U.S. Application Data

(63) Continuation of application No. 14/559,213, filed on Dec. 3, 2014, now Pat. No. 9,674,021.
(Continued)

(51) Int. Cl.
*H04L 27/26* (2006.01)
*H04L 1/00* (2006.01)
(Continued)

(52) U.S. Cl.
CPC .......... *H04L 27/2646* (2013.01); *G06F 11/10* (2013.01); *H04L 1/00* (2013.01); *H04L 1/0041* (2013.01); *H04L 1/0071* (2013.01); *H04L 1/0075* (2013.01); *H04L 5/0064* (2013.01); *H04L 12/18* (2013.01); *H04L 27/26* (2013.01);
(Continued)

(58) Field of Classification Search
CPC . H04L 27/265; H04L 27/2613; H04L 1/0042; H04L 1/0067; H04L 27/2646; H04W 72/005; H03M 13/27; H03M 13/11
See application file for complete search history.

(56) References Cited

U.S. PATENT DOCUMENTS 8,102,922 B2 * 1/2012 Chang ................... H04L 1/0045
375/241
8,503,551 B2 8/2013 Ko
(Continued)

FOREIGN PATENT DOCUMENTS

EP 0869647 A2 10/1998
EP 2056510 A2 5/2009
(Continued)

*Primary Examiner* — Shelly A Chase
(74) *Attorney, Agent, or Firm* — Dentons US LLP

(57) ABSTRACT

Disclosed is an apparatus for transmitting a broadcast signal, including: an input formatting module configured to demultiplex an input stream into at least one Data Pipe (DP); a BICM (Bit Interleaved Coding and Modulation) module configured to perform error correction processing on data of the DP; a frame building module configured to map the data of the DP to symbols within a frame; an OFDM generation module configured to generate a transmission signal by inserting a preamble into the frame and performing OFDM modulation; and a transmission parameter control module configured to set at least one transmission parameter and control transmission signal processing of the frame building module and the OFDM generation module.

12 Claims, 46 Drawing Sheets

Related U.S. Application Data

(60) Provisional application No. 61/945,832, filed on Feb. 28, 2014, provisional application No. 61/942,042, filed on Feb. 20, 2014, provisional application No. 61/927,946, filed on Jan. 15, 2014, provisional application No. 61/927,949, filed on Jan. 15, 2014, provisional application No. 61/921,053, filed on Dec. 26, 2013, provisional application No. 61/912,562, filed on Dec. 6, 2013.

(51) Int. Cl.
*G06F 11/10* (2006.01)
*H04L 5/00* (2006.01)
*H04L 12/18* (2006.01)

(52) U.S. Cl.
CPC ........ *H04L 27/265* (2013.01); *H04L 27/2611* (2013.01); *H04L 27/2613* (2013.01); *H04L 27/2649* (2013.01); *H04L 27/2655* (2013.01)

(56) References Cited

U.S. PATENT DOCUMENTS

| | | |
|---|---|---|
| 2008/0240275 A1 | 10/2008 | Cai |
| 2013/0039303 A1 | 2/2013 | Stadelmeier |
| 2013/0121257 A1 | 5/2013 | He et al. |
| 2013/0157590 A1 | 6/2013 | Mo et al. |

FOREIGN PATENT DOCUMENTS

| | | | | |
|---|---|---|---|---|
| EP | 2219313 A1 | 8/2010 | | |
| EP | 2571186 A2 | 3/2013 | | |
| JP | 2011129974 A | 6/2011 | | |
| WO | WO 2008111810 A1 * | 9/2008 | ........... | H04L 1/0065 |
| WO | WO 2009084837 * | 7/2009 | ............. | H04H 20/33 |
| WO | 2011099719 A2 | 8/2011 | | |
| WO | 2011001632 A1 | 12/2012 | | |

\* cited by examiner

FIG. 12

| Content | Bits |
|---|---|
| PHY_PROFILE | 3 |
| FFT_SIZE | 2 |
| GI_FRACTION | 3 |
| EAC_FLAG | 1 |
| POLOT_MODE | 1 |
| PAPR_FLAG | 1 |
| FRU_CONFIGURE | 3 |
| RESERVED | 7 |

FIG. 13

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
| FRU_PHY_PROFILE | 3 |
| FRU_FRAME_LENGTH | 2 |
| FRU_GI_FRACTION | 3 |
| RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 14

| Content | Bit |
|---|---|
| FIC_FLAG | 1 |
| AUX_FLAG | 1 |
| NUM_DP | 6 |
| for i = NUM_DP | |
| DP_ID | 6 |
| DP_TYPE | 3 |
| DP_GROUP_ID | 8 |
| BASE_DP_ID | 6 |
| DP_FEC_TYPE | 2 |
| DP_COD | 4 |
| DP_MOD | 4 |
| DP_SSD_FLAG | 1 |
| if PHY_PROFILE = '010' | |
| DP_MIMO | 3 |
| end | |
| DP_TI_TYPE | 1 |
| DP_TI_LENGTH | 2 |
| DP_TI_BYPASS | 1 |
| DP_FRAME_INTERVAL | 2 |
| DP_FIRST_FRAME_IDX | 5 |
| DP_NUM_BLOCK_MAX | 10 |
| DP_PAYLOAD_TYPE | 2 |
| DP_INBAND_MODE | 2 |
| DP_PROTOCOL_TYPE | 2 |
| DP_CRC_MODE | 2 |
| if DP_PAYLOAD_TYPE==TS('00') | |
| DNP_MODE | 2 |
| ISSY_MODE | 2 |
| HC_MODE_TS | 2 |
| if HC_MODE_TS=='01' or '10' | |
| PID | 13 |
| end | |
| RESERVED | 2 |
| if DP_PAYLOAD_TYPE==IP('01') | |
| HC_MODE_IP | 8 |
| end | |
| RESERVED | 8 |
| end | |
| if FIC_FLAG == 1 | |
| FIC_VERSION | 8 |
| FIC_LENGTH_BYTE | 13 |
| RESERVED | 8 |
| end | |
| if AUX_FLAG == 1 | |
| NUM_AUX | 4 |
| AUX_CONFIG_RFU | 8 |
| for i=1:NUM_AUX | |
| AUX_STREAM_TYPE | 4 |
| AUX_PRIVATE_CONF | 28 |
| end | |
| end | |

FIG. 15

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
| DP_ID | 6 |
| DP_START | 15 (or 13) |
| DP_NUM_BLOCK | 10 |
| RESERVED | 8 |
| end | |
| EAC_FLAG | 1 |
| EAS_WAKE_UP_VERSION_NUM | 8 |
| if EAC_FLAG == 1 | |
| EAC_LENGTH_BYTE | 12 |
| else | |
| EAC_COUNTER | 12 |
| end | |
| for i = 1:NUM_AUX | |
| AUX_PRIVATE_DYN | 48 |
| end | |
| CRC 32 | 32 |

27b
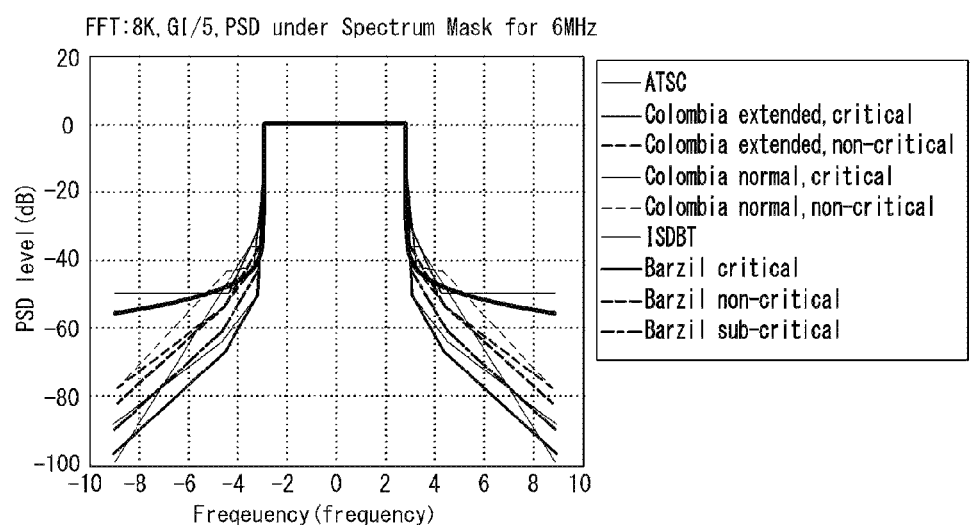

27c
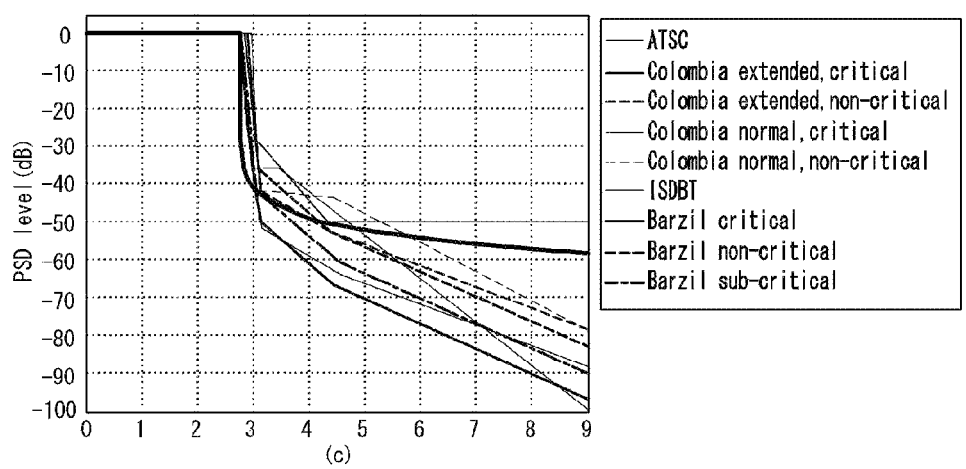

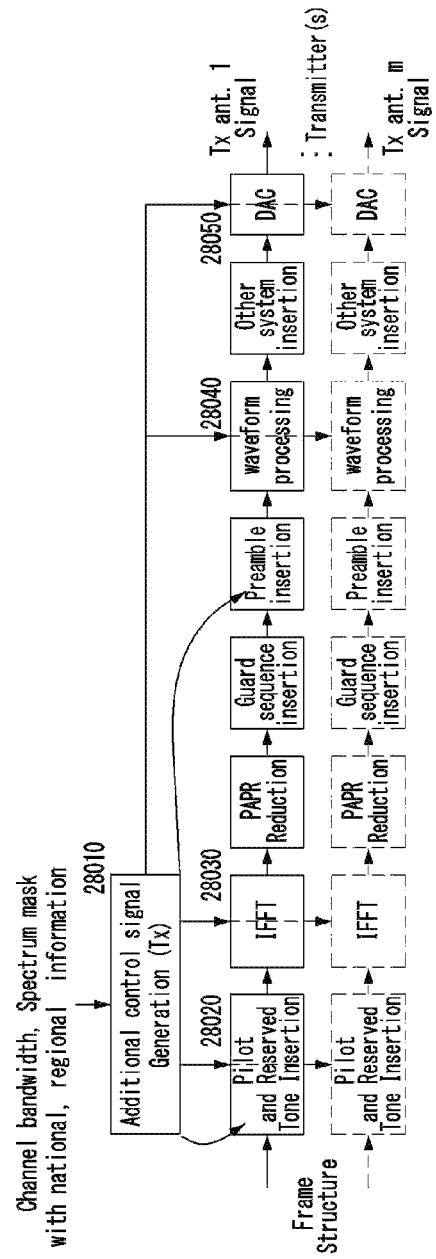

FIG. 34
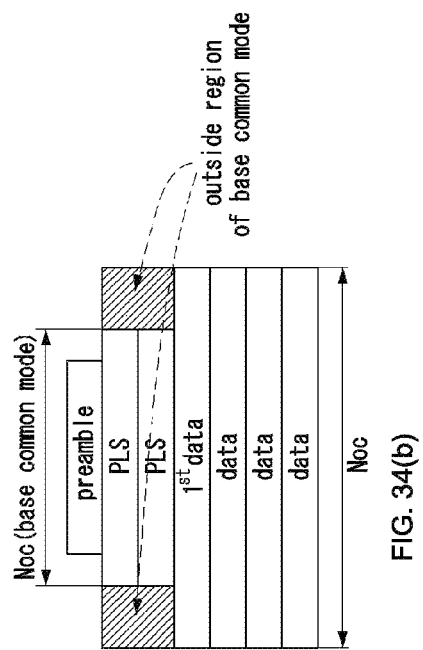
FIG. 34(b)
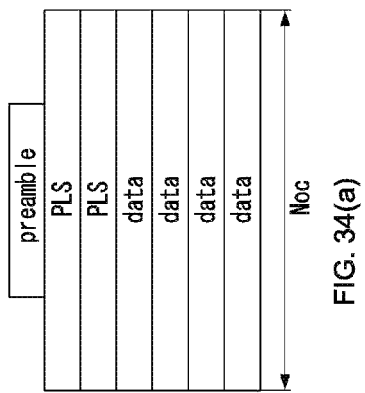
FIG. 34(a)

| Spectrum mask | 8K | 16K | 32K |
|---|---|---|---|
| (Base common)<br>Brazil (6M)<br>Japan(ISDBT) (6M) | 6657<br>(128x51+128x0+1) | 13312<br>(256x52+256x0+1) | 26624<br>(256x104+256x0+1) |
| Col, nor (6M) | 6785<br>(128x51+128x1+1) | 13568<br>(256x52+256x1+1) | 27136<br>(256x104+256x2+1 |
| Col, ext (6M) | 6913<br>(128x51+128x2+1) | 13825<br>(256x52+256x2+1) | 27649<br>(256x104+256x4+1)<br>27905<br>(256x104+256x5+1) |
| ATSC (opt1) (6M)<br>ATSC (opt2) (6M) | 6913<br>(128x51+128x2+1)<br>7041<br>(128x51+128x3+1) | 13825<br>(256x52+256x2+1)<br>14081<br>(256x52+256x3+1) | 28161<br>(256x104+256x6+1)<br>28417<br>(256x104+256x7+1) |

| Spectrum mask | 8K | 16K | 32K |
|---|---|---|---|
| (Base common) Brazil (6M) Japan(ISDBT) (6M) | 6657 (128x51+128x0+1) | 13312 (256x52+256x0+1) | 26624 (256x104+256x0+1) |
| Col, nor (6M) DVB (7M) | 6785 (128x51+128x1+1) | 13568 (256x52+256x1+1) | 27136 (256x104+256x2+1 |
| Col, ext (6M) | 6913 (128x51+128x2+1) | 13825 (256x52+256x2+1) | 27649 (256x104+256x4+1) 27905 (256x104+256x5+1) |
| ATSC (opt1) (6M) ATSC (opt2) (6M) | 6913 (128x51+128x2+1) 7041 (128x51+128x3+1) | 13825 (256x52+256x2+1) 14081 (256x52+256x3+1) | 28161 (256x104+256x6+1) 28417 (256x104+256x7+1) |

| Spectrum mask | 8K | 16K | 32K |
|---|---|---|---|
| (Base common)<br>Brazil (6M)<br>Japan(ISDBT) (6M) | 6657<br>(128x51+128x0+1) | 13312<br>(256x52+256x0+1) | 26624<br>(256x104+256x0+1) |
| Col, nor (6M)<br>DVB (7M)<br>DVB (8M)<br>DTMB, critical (8M) | 6785<br>(128x51+128x1+1) | 13568<br>(256x52+256x1+1) | 27136<br>(256x104+256x2+1 |
| Col, ext (6M)<br>DVB (8M)<br>DTMB, non-critical (8M) | 6913<br>(128x51+128x2+1) | 13825<br>(256x52+256x2+1) | 27649<br>(256x104+256x4+1)<br>27905<br>(256x104+256x5+1) |
| ATSC (opt1) (6M)<br><br>ATSC (opt2) (6M) | 6913<br>(128x51+128x2+1)<br>7041<br>(128x51+128x3+1) | 13825<br>(256x52+256x2+1)<br>14081<br>(256x52+256x3+1) | 28161<br>(256x104+256x6+1)<br>28417<br>(256x104+256x7+1) |

FIG. 40

| GI (sample) | GI (us) for channel BW | | | FFT size | | | Dy (pilot distance in time direction) |
|---|---|---|---|---|---|---|---|
| | 6MHz (BSR:48/7MHz) | 7MHz (BSR:48/7MHz) | 8MHz (BSR:48/7MHz) | 8K | 16K | 32K | |
| | | | | (pilot distance in freq. direction) | Dx | | |
| 206 | 30 | 26 | 23 | 32 | 64 | 128 | 8K, 16K : 2 or 4 |
| 412 | 60 | 52 | 45 | 16 | 32 | 64 | |
| 824 | 120 | 103 | 90 | 8 | 16 | 32 | 32K : 2 |
| 1648 | 240 | 206 | 180 | 4 | 8 | 16 | |
| 2472 | 361 | 309 | 270 | | 4 | 8 | |
| 3296 | 481 | 412 | 361 | | 4 | 8 | |
| 4120 | 601 | 515 | 451 | | | 4 | |
| 4944 | 721 | 618 | 541 | | | 4 | |

FIG. 41(a)  Asp(a) - for each pilot pattern
- Normal data symbol

| | PP4-2 | PP4-4 | PP8-2 | PP8-4 | PP16-2 | PP16-4 | PP32-2 | PP32-4 | PP64-2 | PP64-4 | PP128-2 |
|---|---|---|---|---|---|---|---|---|---|---|---|
| SISO | 1.4475 | 1.5067 | 1.5395 | 1.8056 | 1.8466 | 2.1564 | 2.2046 | 2.5710 | 2.6268 | 3.0594 | 3.1273 |
| MIMO | - | - | 1.2728 | 1.5067 | 1.5395 | 1.8056 | 1.8466 | 2.1564 | 2.2046 | 2.5710 | 2.6268 |

- FSS/FES

| | Dx4 | Dx8 | Dx16 | Dx32 | Dx64 | Dx128 |
|---|---|---|---|---|---|---|
| SISO | 1.1045 | 1.3675 | 1.6553 | 1.9850 | 2.3685 | 2.8231 |
| MIMO | - | 1.1045 | 1.3675 | 1.6553 | 1.9850 | 2.3685 |

FIG. 41(b)  Asp (b) - average value for same pilot density
- Normal data symbol

| | PP4-2 | PP4-4 | PP8-2 | PP8-4 | PP16-2 | PP16-4 | PP32-2 | PP32-4 | PP64-2 | PP64-4 | PP128-2 |
|---|---|---|---|---|---|---|---|---|---|---|---|
| SISO | 1.26 | | 1.52 | | 1.83 | | 2.18 | | 2.60 | | 3.09 |
| MIMO | - | | -/1.26 | | 1.52 | | 1.83 | | 2.18 | | 2.60 |

- FSS/FES

| | Dx4 | Dx8 | Dx16 | Dx32 | Dx64 | Dx128 |
|---|---|---|---|---|---|---|
| SISO | 1.10 | 1.37 | 1.66 | 1.99 | 2.37 | 2.82 |
| MIMO | - | 1.10 | 1.37 | 1.66 | 1.99 | 2.37 |

FIG. 41(c)  Asp (c) - average value for same pilot density (approximated & fractional description)
- Normal data symbol

| | PP4-2 | PP4-4 | PP8-2 | PP8-4 | PP16-2 | PP16-4 | PP32-2 | PP32-4 | PP64-2 | PP64-4 | PP128-2 |
|---|---|---|---|---|---|---|---|---|---|---|---|
| SISO | 5/4 | | 6/4 | | 9/5 | | 13/6 | | 18/7 | | 18/6 |
| MIMO | - | | -/5/4 | | 6/4 | | 9/5 | | 13/6 | | 18/7 |

- FSS/FES

| | Dx4 | Dx8 | Dx16 | Dx32 | Dx64 | Dx128 |
|---|---|---|---|---|---|---|
| SISO | 10/9 | 4/3 | 5/3 | 6/3 | 7/3 | 14/5 |
| MIMO | - | 10/9 | 4/3 | 5/3 | 6/3 | 7/3 |

APPARATUS AND METHOD FOR SENDING AND RECEIVING BROADCAST SIGNALS

CROSS-REFERENCE TO RELATED APPLICATIONS

This application is a continuation of U.S. application Ser. No. 14/559,213, filed on Dec. 3, 2014, now allowed, and claims priority to and the benefit of U.S. Provisional Application Nos. 61/945,832 filed Feb. 28, 2014, 61/942,042 filed Feb. 20, 2014, 61/927,946 filed Jan. 15, 2014, 61/927,949 filed Jan. 15, 2014, 61/921,053 filed Dec. 26, 2013, and 61/912,562 filed Dec. 6, 2013, all of which are hereby incorporated by reference for all purposes as if fully set forth herein in their entireties.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, an object of the present invention is to provide an apparatus and method for transmitting broadcast signals as multiplex data for a broadcast transmission/reception system that provides two or more different broadcast services in a time domain and transmitting the multiplexed data through the same RF signal bandwidth and an apparatus and method for receiving broadcast signals as multiplex data for a broadcast transmission/reception system.

Another object of the present invention is to provide an apparatus for transmitting broadcast signals, an apparatus for receiving broadcast signals, and methods for transmitting and receiving broadcast signals, wherein data corresponding to services are classified by components, data corresponding to each component is transmitted as a data pipe, and the data is received and processed.

Still another object of the present invention is to provide an apparatus for transmitting broadcast signals, an apparatus for receiving broadcast signals, and methods for transmitting and receiving broadcast signals as signal that signals information necessary to provide broadcast signals.

Technical objects to be solved by the present invention are not limited to the aforementioned technical objects and unmentioned technical objects will be clearly understood by those skilled in the art from the specification and the appended claims.

In accordance with an embodiment of the present invention, there is provided an apparatus for transmitting a broadcast signal, comprising: an input formatting module configured to demultiplex an input stream into at least one Data Pipe (DP); a BICM (Bit Interleaved Coding and Modulation) module configured to perform error correction processing on data of the DP; a frame building module configured to generate a signal frame including the data of the DP; an OFDM generation module configured to generate a transmission signal by inserting a preamble into the signal frame and performing OFDM modulation; and a transmission parameter control module configured to set at least one transmission parameter and control transmission signal processing of the frame building module and the OFDM generation module.

In accordance with an embodiment of the present invention, there is provided an apparatus for receiving a broadcast signal, comprising: a synchronization/demodulation module configured to perform signal detection and OFDM demodulation on a received broadcast signal; a frame parsing module configured to extract service data by parsing a signal frame of the broadcast signal; a demapping and decoding module configured to convert the broadcast signal into a bit domain and to perform de-interleaving; and an output processing module configured to receive the service data and to output a data stream; and a transmission parameter control module configured to set at least one transmission parameter and control a received signal processing of the synchronization/demodulation module and the frame parsing module.

BRIEF DESCRIPTION OF THE DRAWINGS

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIGS. 27a, 27b, and 27c are conceptual diagrams illustrating a spectrum mask and a corresponding transmission signal bandwidth.

FIG. 28 is a diagram illustrating an OFDM generation module in accordance with an embodiment of the present invention.

FIGS. 32(a), 32(b), 32(c-1), 32(c-2) and 32(c-3) illustrate a method of extending a bandwidth based on the base common mode while maintaining the NoA per symbol in accordance with an embodiment of the present invention.

FIGS. 34(a) and 34(b) are diagrams illustrating a method of signaling a transmission parameter in accordance with an embodiment of the present invention.

FIG. 40 is a diagram illustrating a transmission parameter for the transmission of a broadcast signal in accordance with another embodiment of the present invention.

FIGS. 41(a), 41(b), and 41(c) illustrate the pilot boosting parameters in accordance with an embodiment of the present invention.

DETAILED DESCRIPTION OF THE EMBODIMENTS

Figure 1:
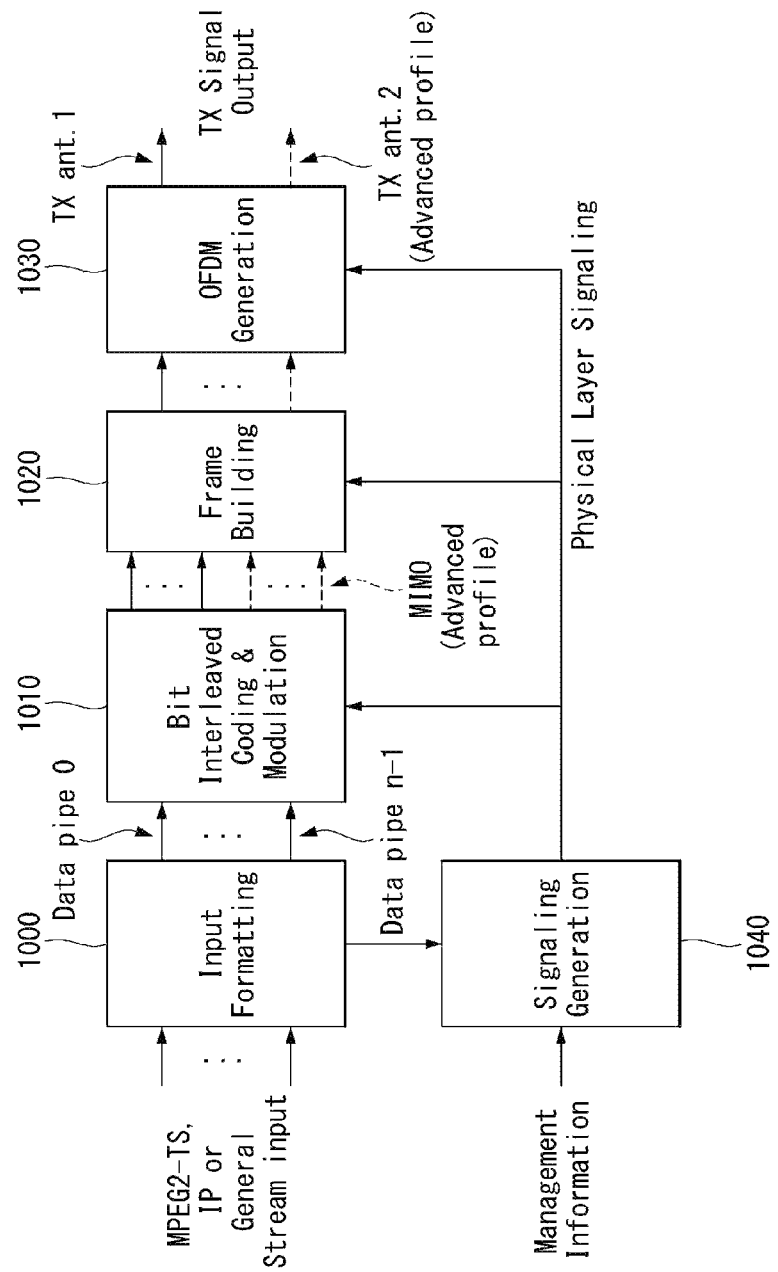
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings. Also, the term block and module are used similarly to indicate logical/functional unit of particular signal/data processing.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16 Kbits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64 Kbits |
| Constellation size | 8~12 bpcu |
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot(sp) pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion XFECBLOCK: set of Ncells cells carrying all the bits of one LDPC FECBLOCK FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams.

In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figures 2A, 2B:
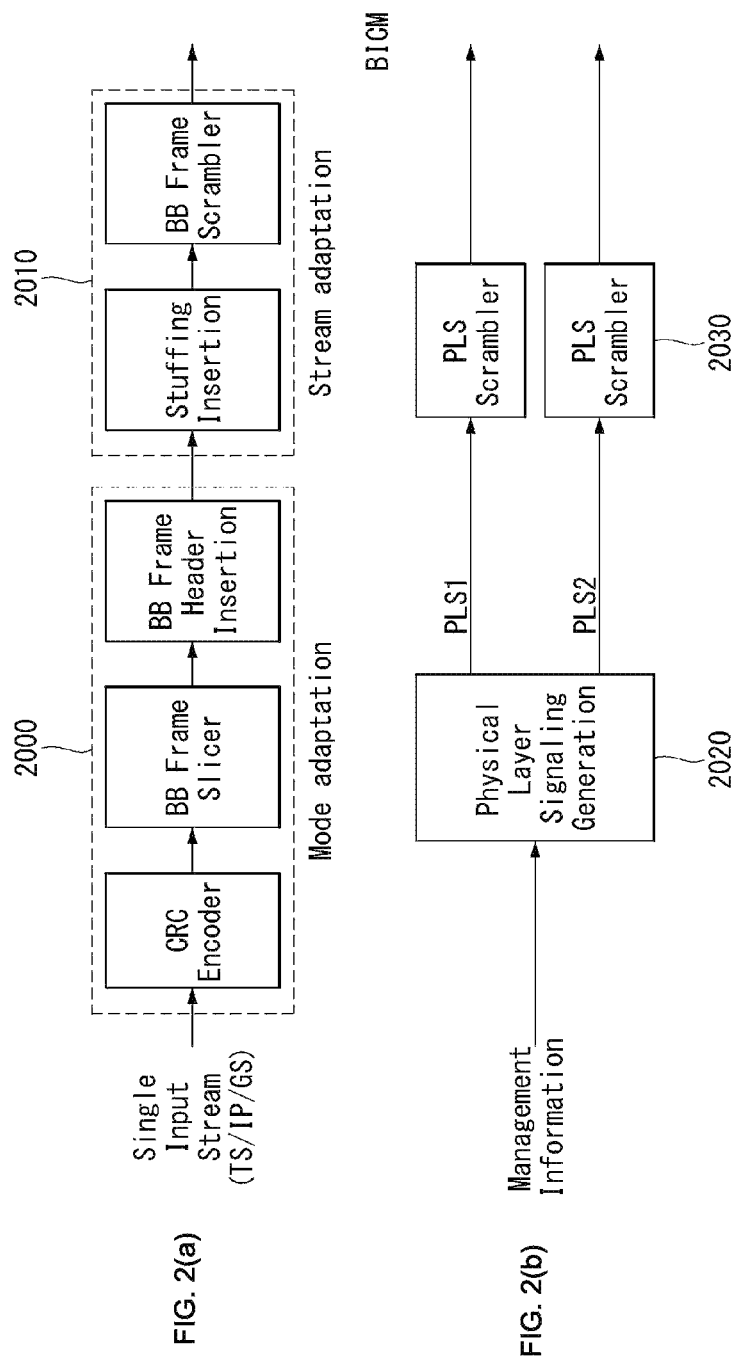
FIGS. 2(a) and 2(b) illustrate an input formatting block according to one embodiment of the present invention.
Figure 3:
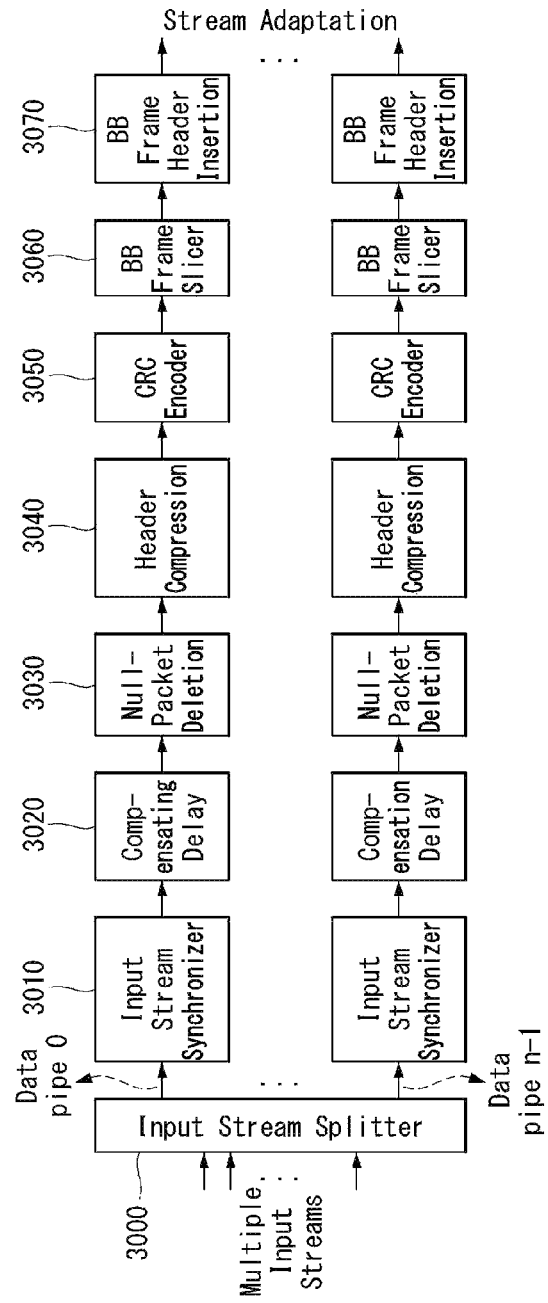
FIG. 3 illustrates an input formatting block according to another embodiment of the present invention.
Figure 4:
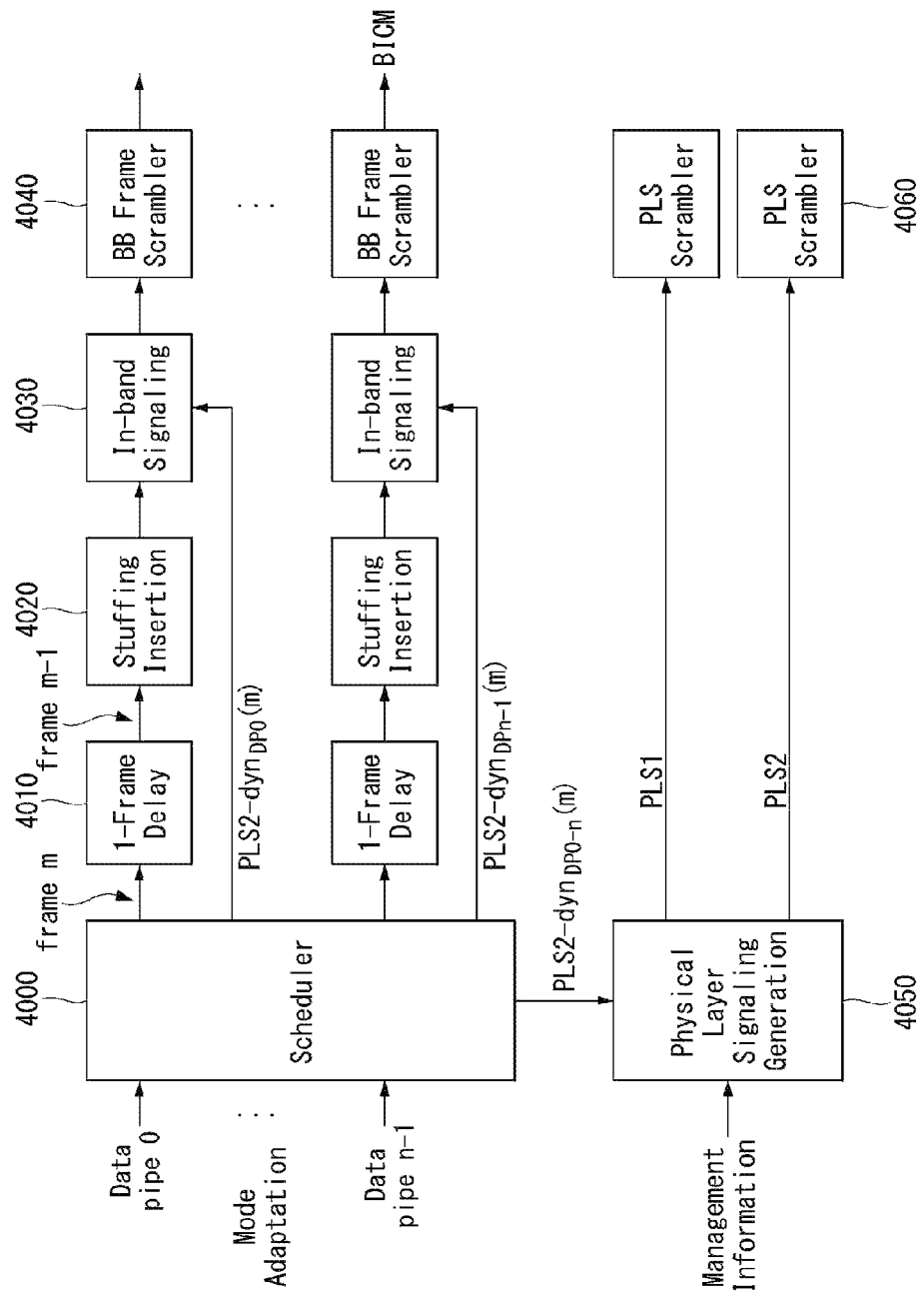
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte)

packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
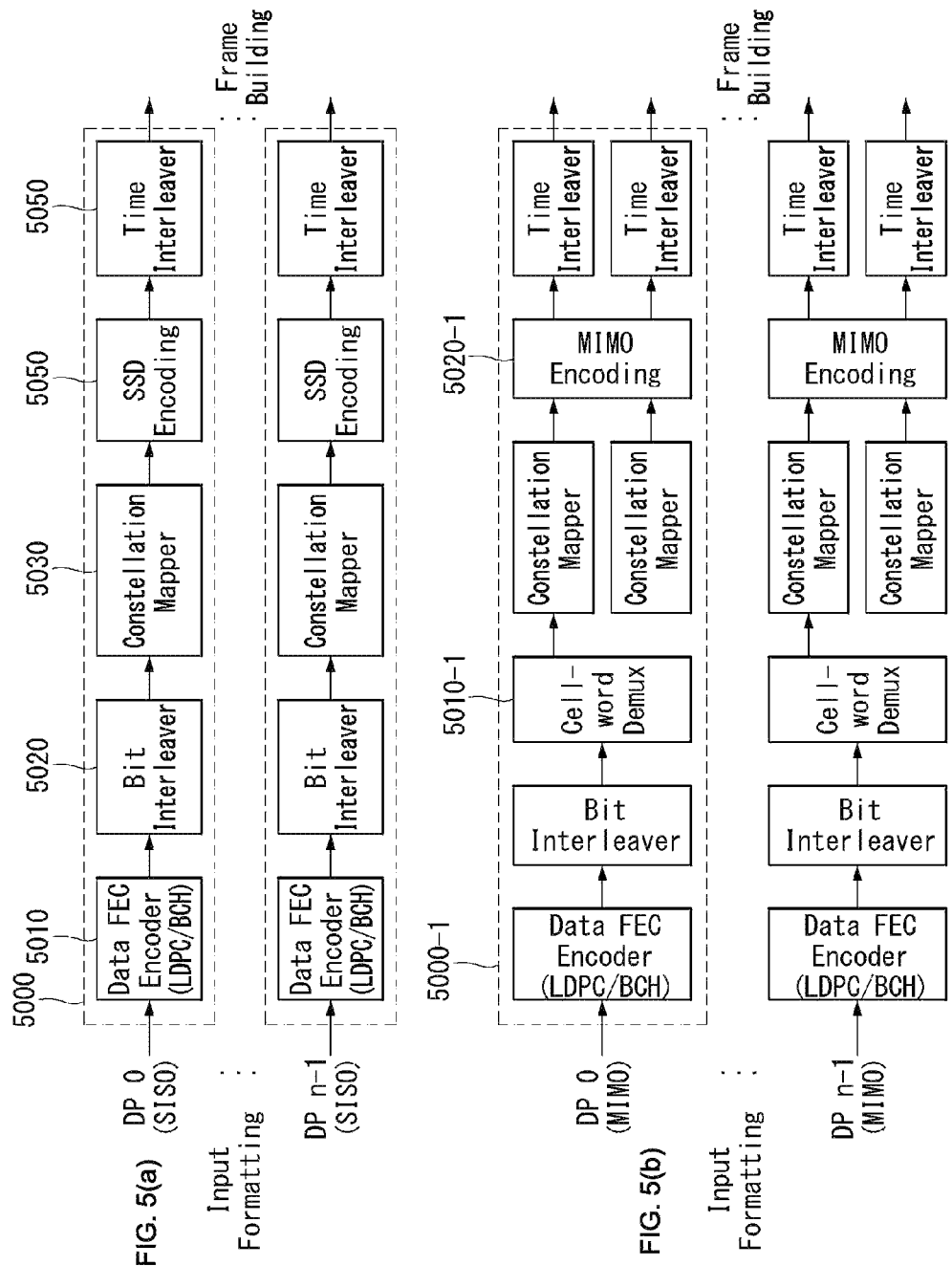
FIGS. 5(a) and 5(b) illustrate a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,$i$ and e2,$i$) are fed to the input of the MIMO Encoder. Paired MIMO Encoder output (g1,$i$ and g2,$i$) is transmitted by the same carrier k and OFDM symbol 1 of their respective TX antennas.

The above-described blocks may be omitted or replaced by blocks having similar or identical functions.

Figure 6:
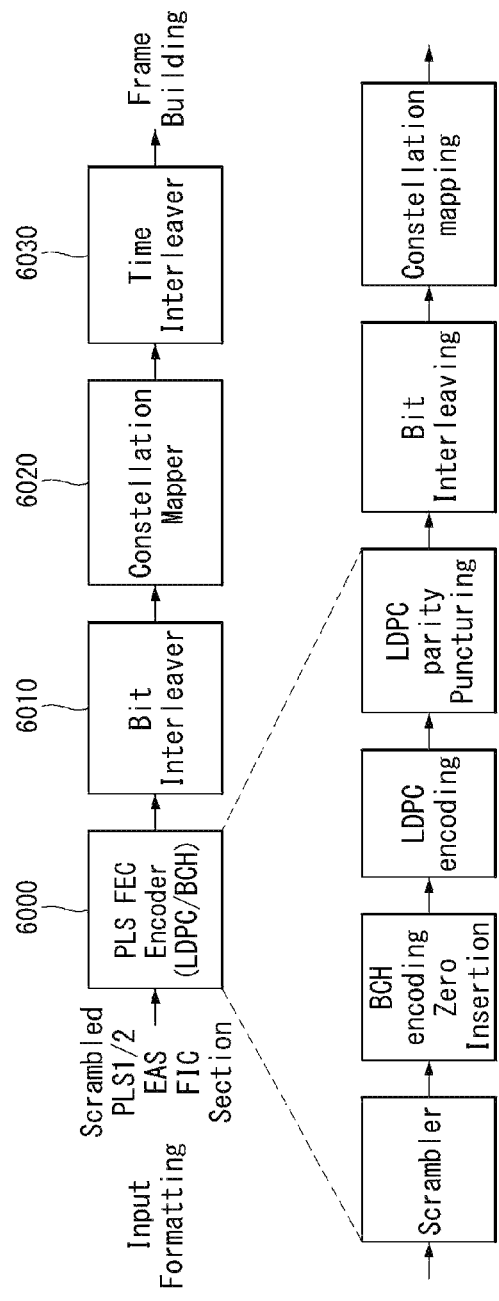
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math figure 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit ineterlaeved PLS1 data and PLS2 data onto constellations.

The time interleaver 6030 can interleave the mapped PLS1 data and PLS2 data.

The above-described blocks may be omitted or replaced by blocks having similar or identical functions.

Figure 7:
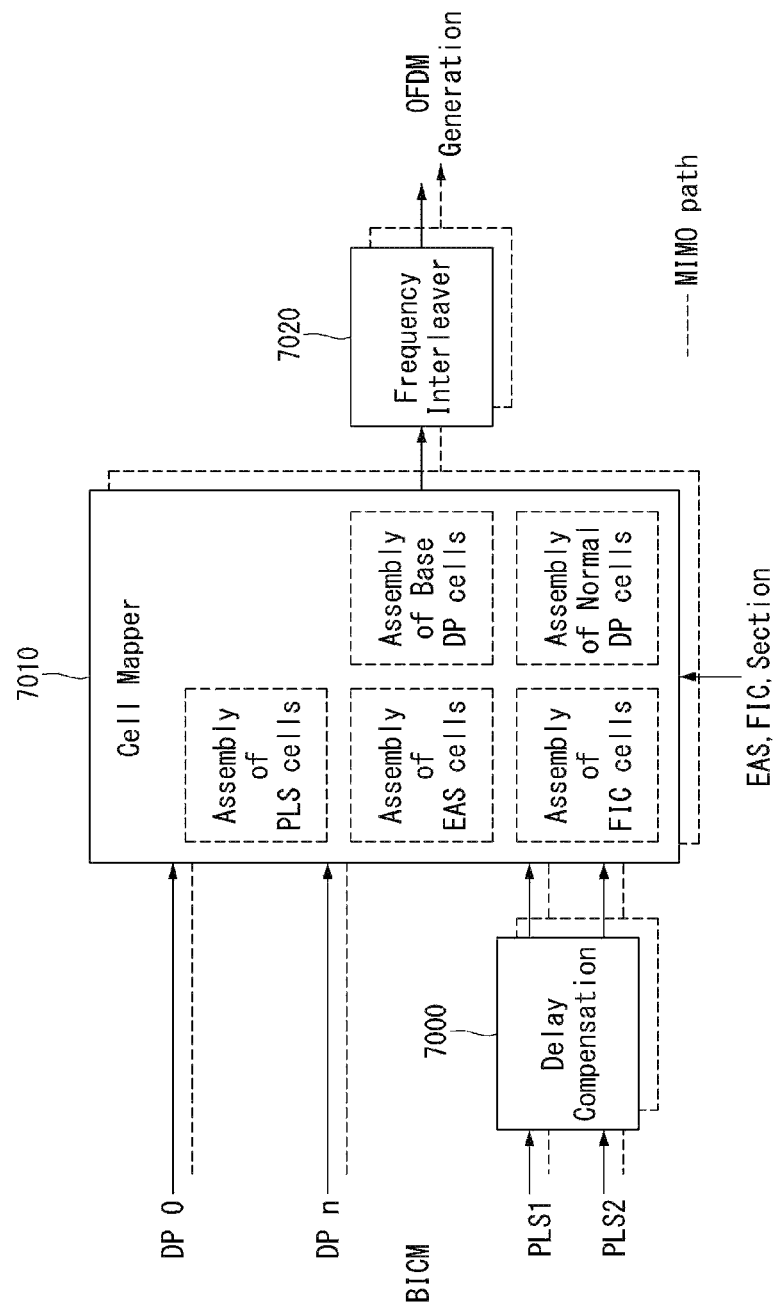
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1. The frame building block generates a signal frame which included the data of a DP.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI(program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

Figure 8:
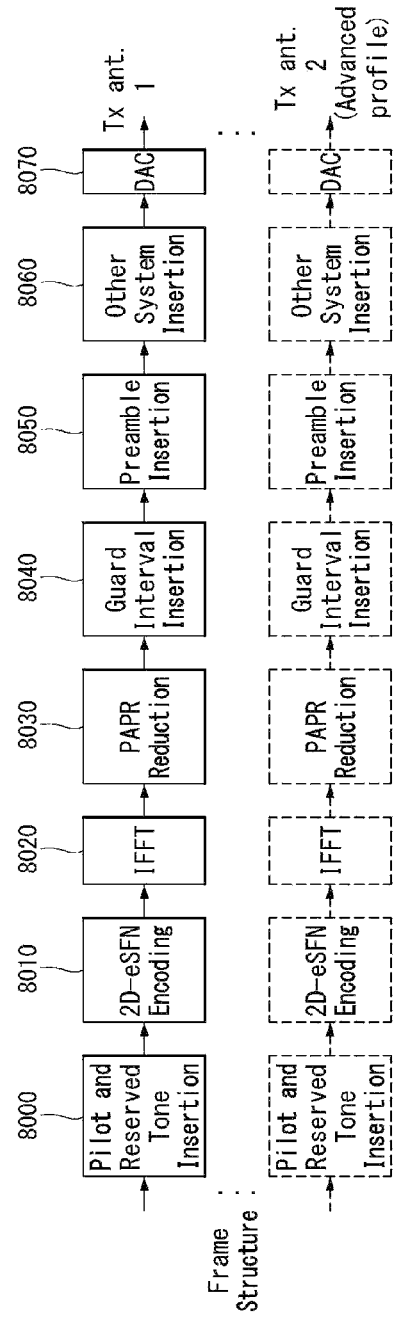
FIG. 8 illustrates an OFDM generation block according to an embodiment of the present invention.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots (SP), continual pilots (CP), edge pilots (EP), FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
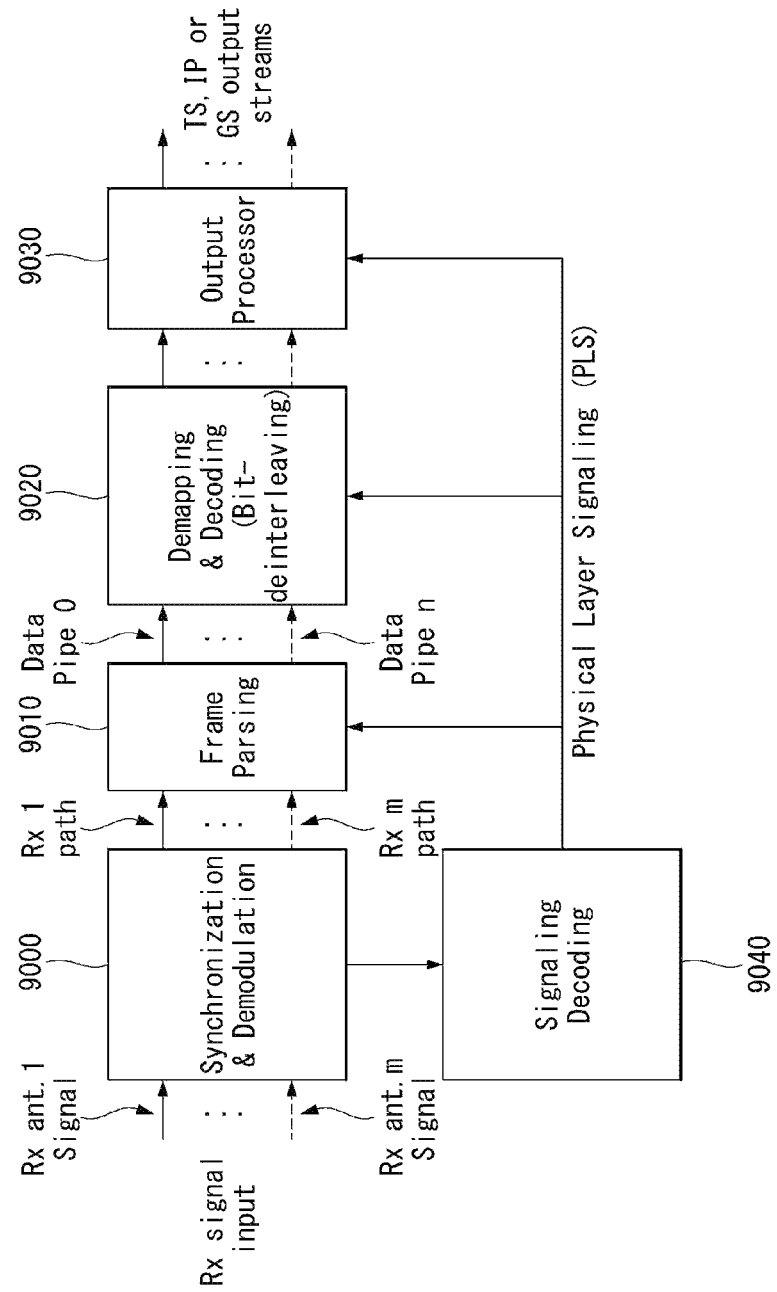
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9020 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 9030 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figures 10A, 10B, 10C, 10D:
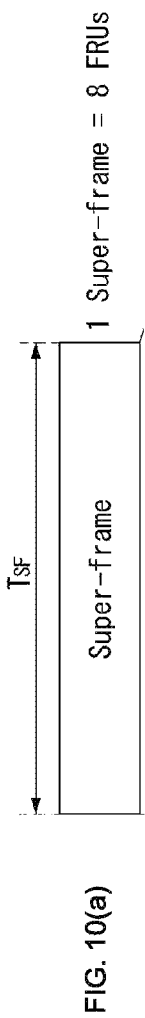
FIGS. 10(a), 10(b), 10(c), and 10(d) illustrate a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS (s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figure 11:
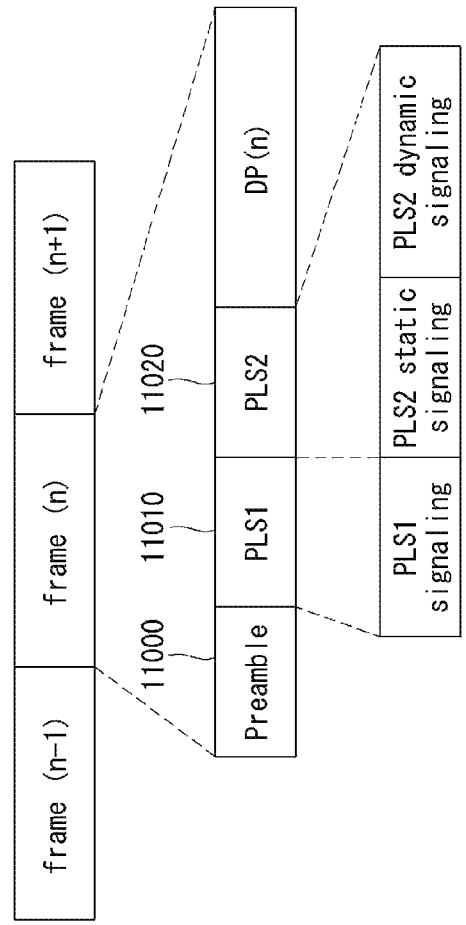
FIG. 11 illustrates a signaling hierarchy structure of the frame according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
| --- | --- |
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

PAYLOAD_TYPE: This 3-bit field indicates the format of the payload data carried in the frame-group. PAYLOAD_TYPE is signaled as shown in table 9.

TABLE 9

| Value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL ID is not known or unspecified, this field is set to '0'.

NETWORK_ID: This is a 16-bit field which uniquely identifies the current ATSC network.

TABLE 8

|  | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Contents | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2 NEXT REP STAT SIZE BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |

TABLE 15-continued

| Value | Code rate |
| --- | --- |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (Pi=1). The allowed PI values with 2-bit field are defined in the below table 18.

TABLE 18

| 2-bit field | PI | NTI |
|---|---|---|
| 00 | 1 | 1 |
| 01 | 2 | 2 |

TABLE 18-continued

| 2-bit field | PI | NTI |
|---|---|---|
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bits | 15 bits |
| Handheld | — | 13 bits |
| Advanced | 13 bits | 15 bits |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

Figure 16:
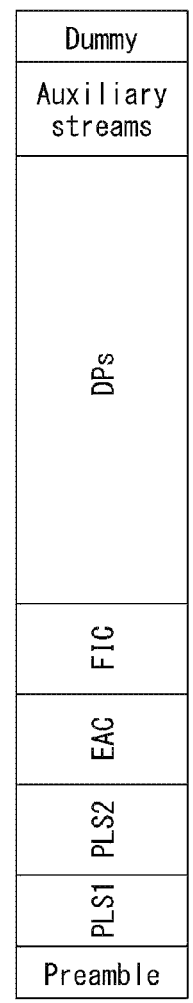
FIG. 16 illustrates a logical structure of a frame according to an embodiment of the present invention.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
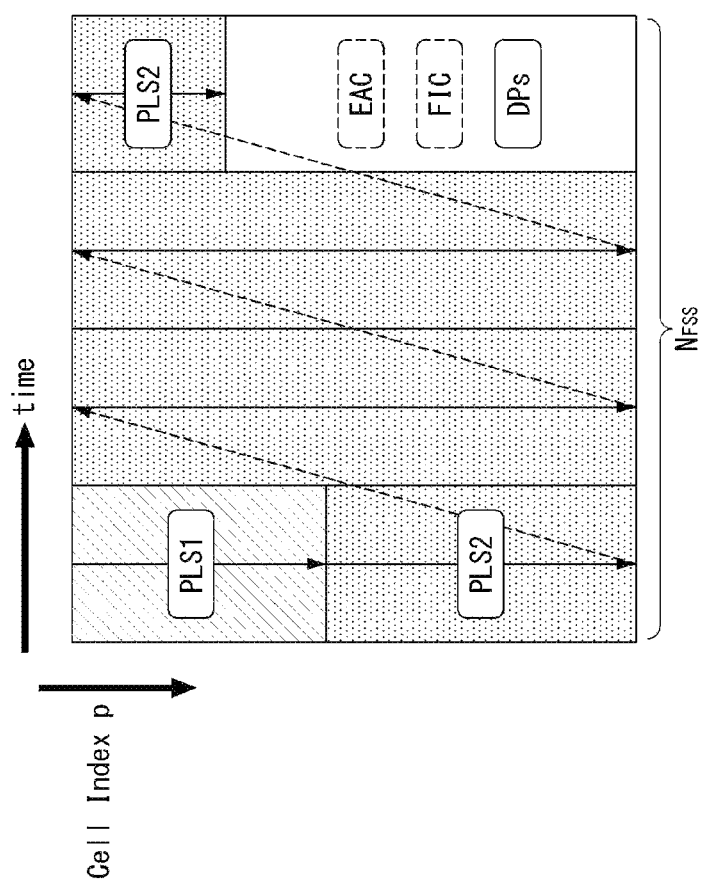
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) N_FSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
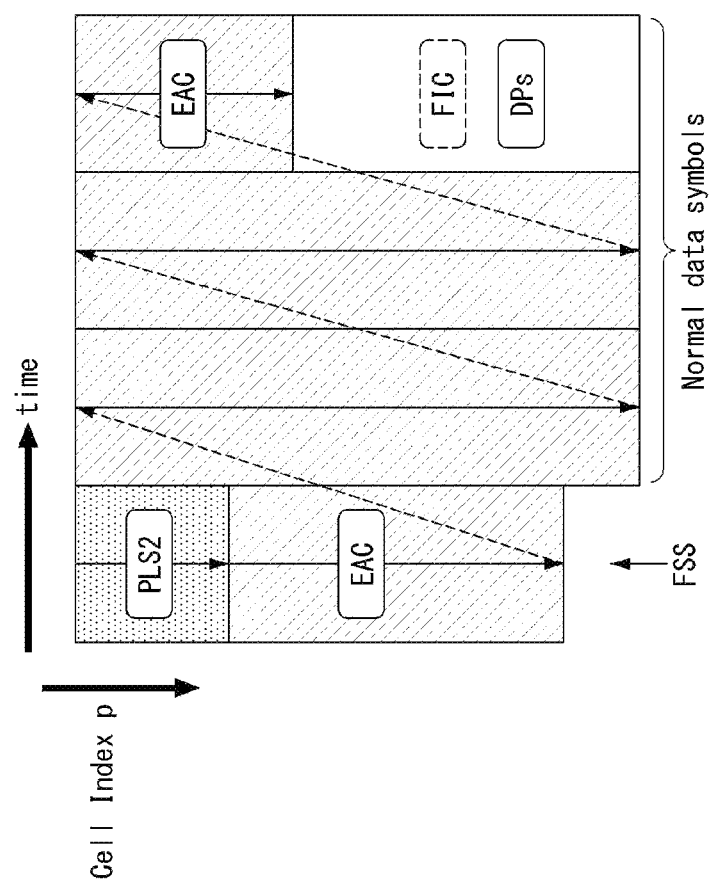
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19A:
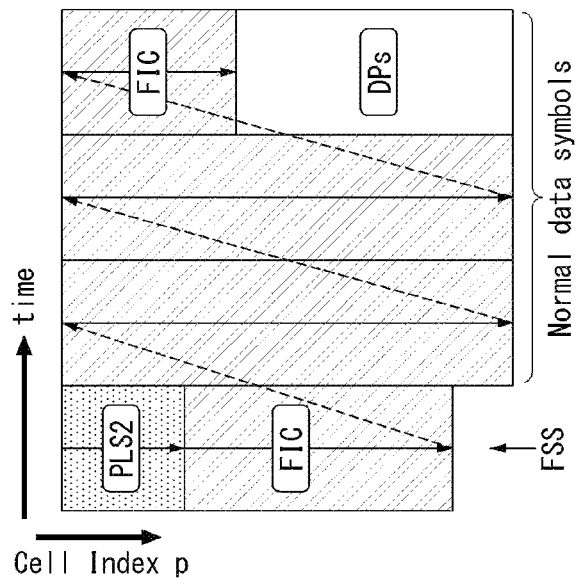
FIGS. 19(a) and 19(b) illustrate FIC mapping according to an embodiment of the present invention.
Figure 19B:
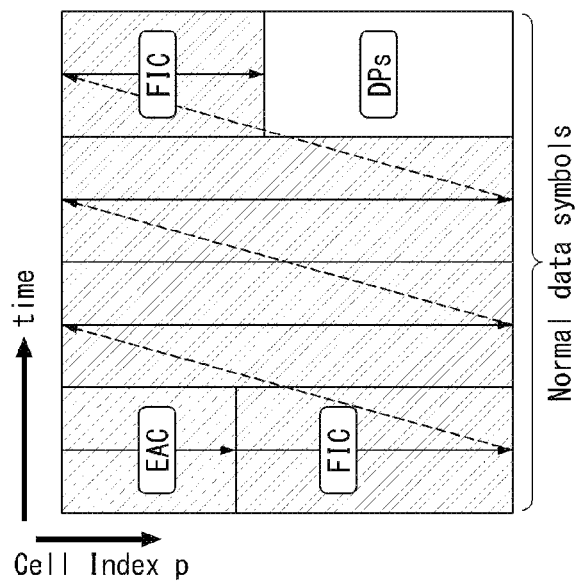

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20A:
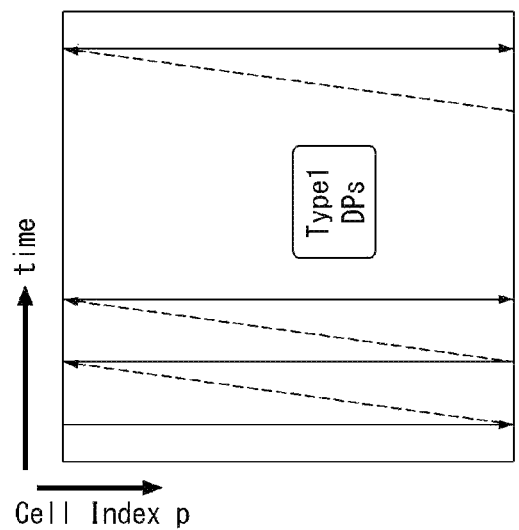
FIGS. 20(a) and 20(b) illustrate a type of DP according to an embodiment of the present invention.
Figure 20B:
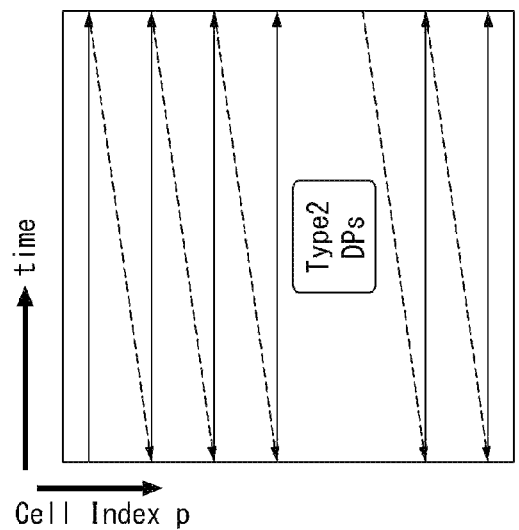

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Math figure 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figures 21A, 21B:
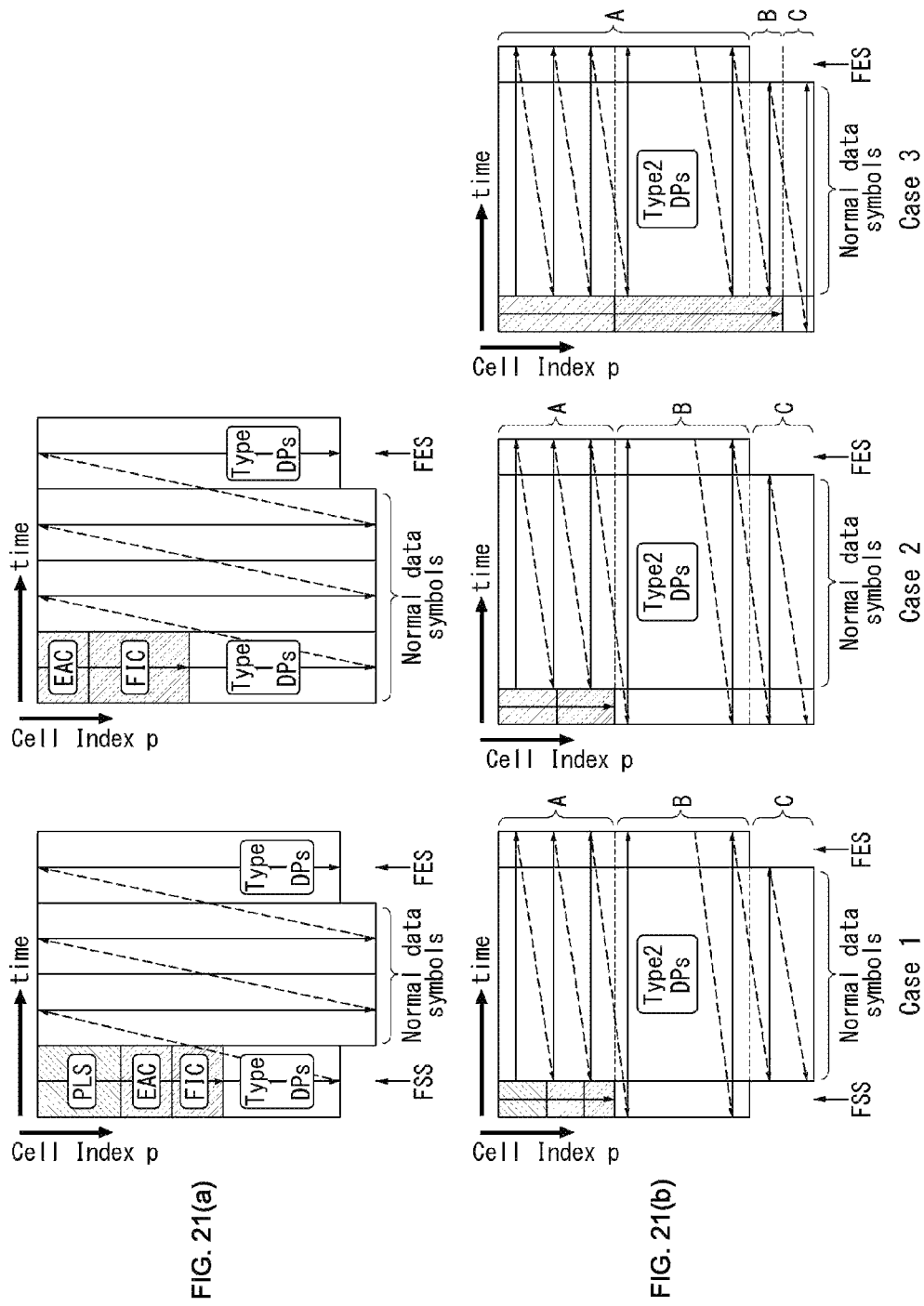
FIGS. 21(a) and 21(b) illustrate DP mapping according to an embodiment of the present invention.

FIG. 21 illustrates DP mapping according to an embodiment of the present invention.

shows an addressing of OFDM cells for mapping type 1 DPs and (b) shows an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
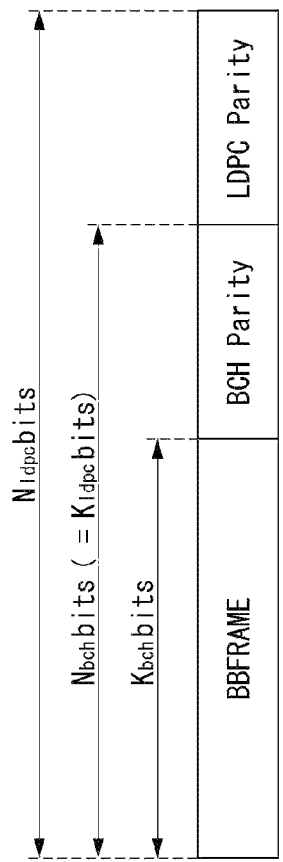
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FEC-BLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch − Kbch |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | Nldpc | Kldpc | Kbch | BCH error correction capability | Nbch − Kbch |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc}=[I_{ldpc} P_{ldpc}]=[i_0, i_1, \ldots, i_{K_{ldpc}-1}, p_0, p_1, \ldots, p_{N_{ldpc}-K_{ldpc}-1}]$$ [Math figure 3]

The parameters for long FECBLOCK and short FEC-BLOCK are given in the above table 28 and 29, respectively.

The detailed procedure to calculate Nldpc−Kldpc parity bits for long FECBLOCK, is as follows:

1) Initialize the parity bits, $$p_0 = p_1 = p_2 = \ldots = p_{N_{ldpc} - K_{ldpc} - 1} = 0 \quad \text{[Math figure 4]}$$

2) Accumulate the first information bit-i0, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0$$

$$p_{4837} = p_{4837} \oplus i_0 \quad p_{4989} = p_{4989} \oplus i_0$$

$$p_{6921} = p_{6921} \oplus i_0 \quad p_{6974} = p_{6974} \oplus i_0$$

$$p_{7572} = p_{7572} \oplus i_0 \quad p_{8260} = p_{8260} \oplus i_0$$

$$p_{8496} = p_{8496} \oplus i_0 \quad \text{[Math figure 5]}$$

3) For the next 359 information bits, is, s=1, 2, ..., 359 accumulate is at parity bit addresses using following Math figure.

$$\{x + (s \bmod 360) \times Q_{ldpc}\} \bmod (N_{ldpc} - K_{ldpc}) \quad \text{[Math figure 6]}$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \quad p_{2839} = p_{2839} \oplus i_1$$

$$p_{4861} = p_{4861} \oplus i_1 \quad p_{5013} = p_{5013} \oplus i_1$$

$$p_{6162} = p_{6162} \oplus i_1 \quad p_{6482} = p_{6482} \oplus i_1$$

$$p_{6945} = p_{6945} \oplus i_1 \quad p_{6998} = p_{6998} \oplus i_1$$

$$p_{7596} = p_{7596} \oplus i_1 \quad p_{8284} = p_{8284} \oplus i_1$$

$$p_{8520} \oplus p_{8520} \oplus i_1 \quad \text{[Math figure 7]}$$

4) For the 361st information bit i360, the addresses of the parity bit accumulators are given in the second row of the addresses of parity check matrix. In a similar manner the addresses of the parity bit accumulators for the following 359 information bits is, s=361, 362, ..., 719 are obtained using the Math Figure 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, \, i=1, 2, \ldots, N_{ldpc} - K_{ldpc} - 1 \quad \text{[Math figure 8]}$$

where final content of pi, i=0, 1, ... Nldpc−Kldpc−1 is equal to the parity bit pi.

TABLE 30

| Code Rate | Qldpc |
|---|---|
| 5/15 | 120 |
| 6/15 | 108 |
| 7/15 | 96 |
| 8/15 | 84 |

TABLE 30-continued

| Code Rate | Qldpc |
|---|---|
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
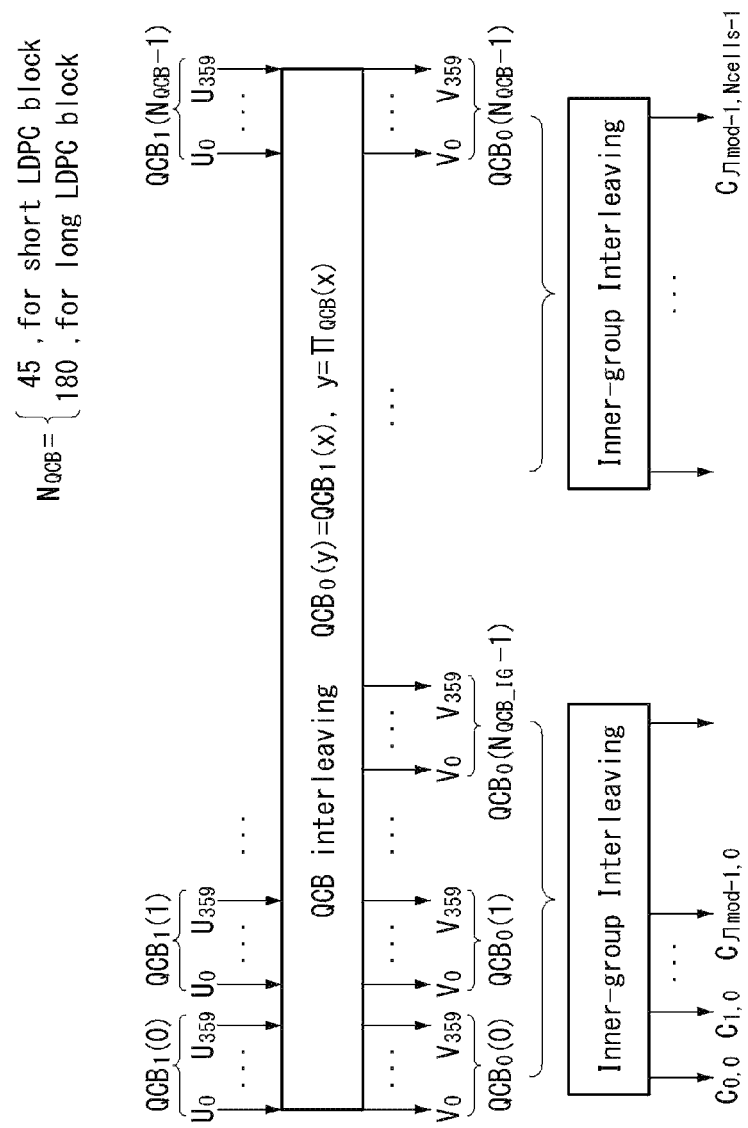
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/ηmod or 16200/ηmod according to the FECBLOCK length. The QCB interleaving pattern is unique to each combination of modulation type and LDPC code rate.

After QCB interleaving, inner-group interleaving is performed according to modulation type and order (ηmod) which is defined in the below table 32. The number of QC blocks for one inner-group, NQCB_IG, is also defined.

TABLE 32

| Modulation type | ηmod | NQCB_IG |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24A:
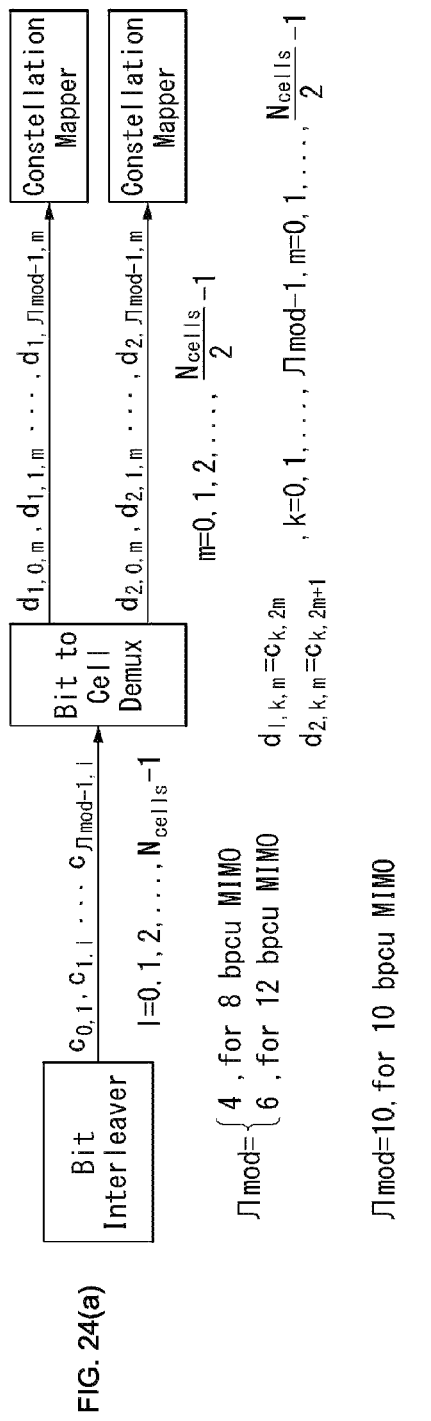
FIGS. 24(a) and 24(b) illustrate a cell-word demultiplexing according to an embodiment of the present invention.
Figure 24B:
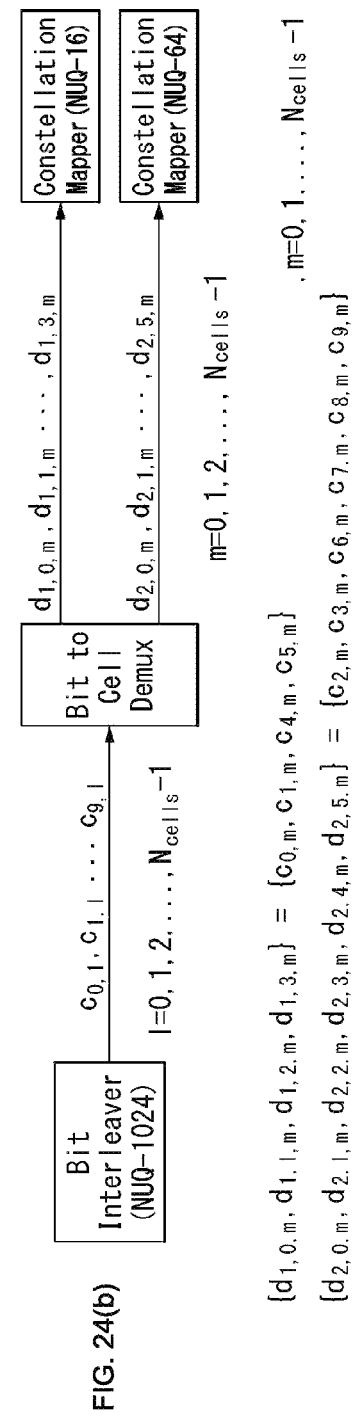

FIG. 24 illustrates a cell-word demultiplexing according to an embodiment of the present invention.

shows a cell-word demultiplexing for 8 and 12 bpcu MIMO and (b) shows a cell-word demultiplexing for 10 bpcu MIMO.

Each cell word (c0,$l$, c1,$l$, . . . , cηmod-1,$l$) of the bit interleaving output is demultiplexed into (d1,0,$m$, d1,1,$m$ . . . , d1,ηmod-1,$m$) and (d2,0,$m$, d2,1,$m$ . . . , d2,ηmod-1,$m$) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,$l$, c1,$l$, . . . , c9,$l$) of the Bit Interleaver output is demultiplexed into (d1,0,$m$, d1,1,$m$ . . . , d1,3,$m$) and (d2,0,$m$, d2,1,$m$ . . . , d2,5,$m$), as shown in (b).

Figure 25A:
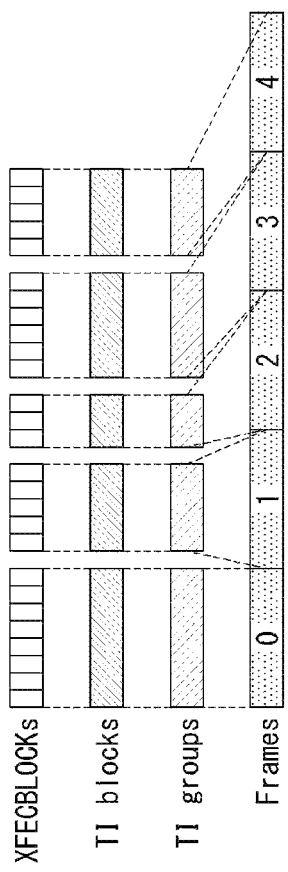
FIGS. 25(a), 25(b), and 25(c) illustrate a time interleaving according to an embodiment of the present invention.
Figure 25B:
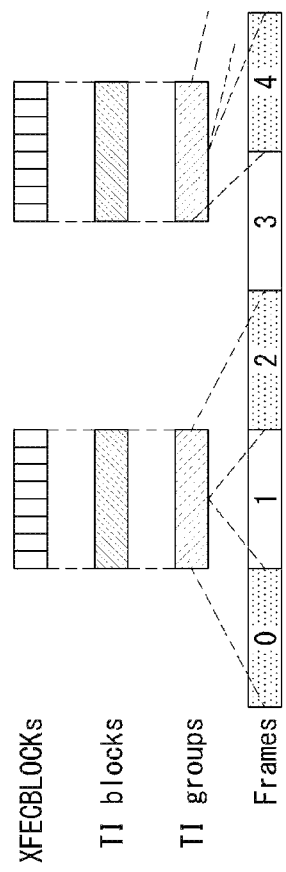
Figure 25C:
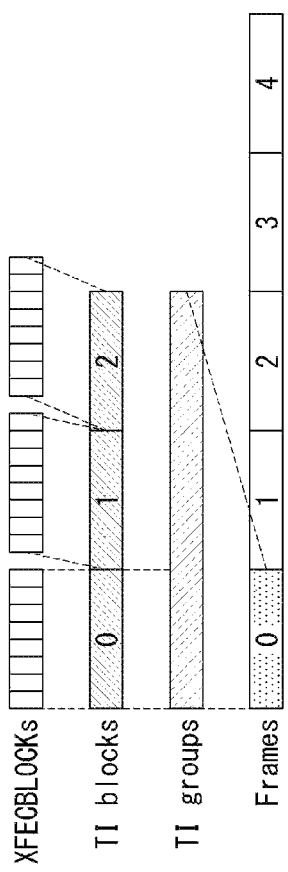

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Mode | Description |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while $P_I$ = 1. |

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1},$$
$$\ldots, d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \ldots \text{encoding} \\ g_{n,s,r,q}, & \text{the output of } MIMO \text{ encoding} \end{cases}.$$

In addition, assume that output XFECBLOCKs from the time interleaver 5050 are defined as $$(h_{n,s,0}, h_{n,s,1}, \ldots, h_{n,s,i}, \ldots, h_{n,s,N_{xBLOCK\_TI}(n,s) \times N_{cells}-1}),$$

where $h_{n,s,i}$ is the ith output cell (for i=0, . . . , $N_{xBLOCK\_TI}$(n,s)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r=N_{cells}$ while the number of columns $N_c$ is equal to the number $N_{xBLOCK\_TI}(n,s)$.

Embodiments of a future broadcast system are described below.

Figure 26:
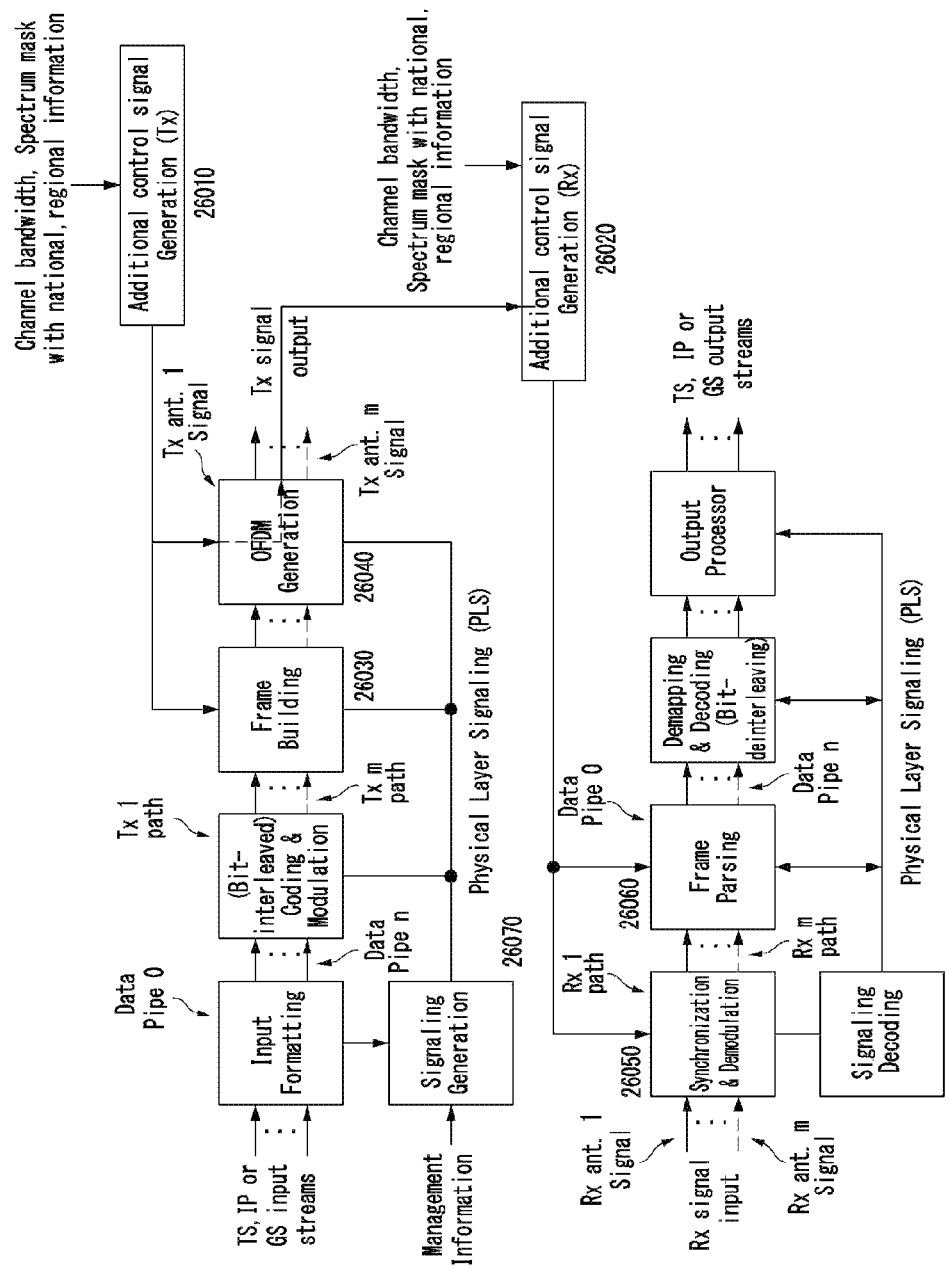
FIG. 26 is a diagram illustrating another embodiment of the broadcast signal transmitter of FIG. 1 and the broadcast signal receiver of FIG. 9.

FIG. 26 is a diagram illustrating another embodiment of the broadcast signal transmitter of FIG. 1 and the broadcast signal receiver of FIG. 9.

Above described broadcast system of FIGS. 1 to 25 may operate in a predetermined transmission band and a corresponding spectrum mask. The present invention proposes a future broadcast system which may select transmission parameters based on different transmission band and corresponding spectrum mask criteria for each of various nations and regions and send and receive broadcast signals. The configuration and operation of each of the blocks of the broadcast signal transmitter and the broadcast signal receiver illustrated in FIG. 26 are similar to those described with reference to FIGS. 1 and 9 and a description of the same blocks and modules is omitted, but the description is also applied to the blocks and modules of FIG. 26. Hereinafter, the broadcast signal transmitter may also be called a broadcast transmitter or a transmitter, and the broadcast signal receiver may also be called a broadcast receiver or a receiver.

In order to select transmission parameters that may satisfy different transmission bandwidth and corresponding spectrum mask criteria with respect to various nations and regions and may maximize transmission signal bandwidths and send and receive broadcast signals, the broadcast transmitter and the broadcast receiver may be respectively equipped with an additional control signal generation module 26010 and an additional control signal generation(or control) module 26020. The additional control signal generation module 26010 on the sender side and the additional control signal generation module 26020 on the receiver side may be called respective transmission parameter control modules. The additional control signal generation modules 26010 and 26020 on the sender and receiver sides may be respectively included in a signal generation module 26070 on the sender side and a signal decoding module 26080 on the receiver side. In such a case, information related to controlled transmission parameters may be input to the signal generation module 26070 as management information.

The additional control signal generation module 26010 on the sender side may control a frame building module 26030 and an OFDM generation module 26040 using an additional control signal, including information about a channel bandwidth and a spectrum mask, along with information about a nation and a region and may output required broadcast signals. Furthermore, the additional control signal generation module 26020 on the receiver side may control a synchronization/demodulation module 26050 and a frame parsing module 26060 using an additional control signal, including information about a channel bandwidth and a spectrum mask, along with information about a nation and a region and may process received broadcast signals. Hereinafter, the additional control signal generation module 26010 and the additional control signal control module 26020 may also be called transmission parameter control modules. In this specification, the additional control signal is indicative of information or a signal that includes transmission parameters for adjusting the bandwidth of a transmission signal or that includes information necessary to control the transmission parameters.

In this specification, a method of sending transmission parameters as additional information on the sender side and a method of previously setting transmission parameters on the sender and receiver sides according to an pre-determined code are proposed as a method of setting transmission parameters in the broadcast system. Furthermore, this specification proposes a method of setting and adjusting transmission parameters so that a signal bandwidth suitable for a broadcast network and use is optimized according to a different channel bandwidth so that a worldwidely flexible broadcast system can be supported.

FIG. 27 is a conceptual diagram illustrating a spectrum mask and a corresponding transmission signal bandwidth.

Figure 27A:
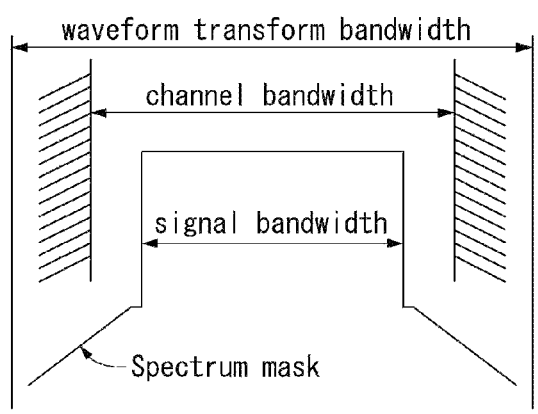

As illustrated in FIG. 27(a), transmission parameters may be set to satisfy a spectrum mask requirement necessary to minimize interference from neighboring channels within a corresponding channel bandwidth and also to maximize transmission efficiency in the signal bandwidth of a transmission signal. Furthermore, if a plurality of carriers is used when OFDM symbols are generated, an OFDM waveform transmission bandwidth may be determined by controlling the interval between subcarriers and/or the entire symbol length in a time domain depending on the number of subcarriers used for transmission. Accordingly, in the case of a future broadcast system, a proper transmission mode may be determined based on a reception scenario requested by a region or nation, and transmission parameters may be designed based on the proper transmission mode.

FIGS. 6(b) and 6(c) illustrate examples of carrier modes and spectrum masks according to output level criteria in various nations with respect to a 6 MHz band. The aforementioned spectrum mask has different limiting criteria depending on a corresponding nation/region and a channel bandwidth used. For example, in the case of the North America ATSC standard and the European DVB standard, different requirements for broadcast spectrum masks need to be satisfied. Accordingly, in order to provide a worldwidely flexible broadcast system, transmission parameters may be controlled and the transmission parameters controlled as additional information. A method of controlling transmission parameters is described below.

$$eBW=\{N_{waveform\_scaling} \times (N_{pilotdensity} \times N_{eBW})+\alpha\} \times Fs$$
(Hz) [Math figure 9]

In Math Figure 9, eBW denotes an effective signal bandwidth, $N_{waveform\_scaling}$ denotes a waveform scaling factor, $N_{pilotdensity}$ denotes a pilot density scaling factor, $N_{eBW}$ denotes an effective signal bandwidth scaling factor, $\alpha$ denotes an additional bandwidth factor, and Fs denotes a waveform transform bandwidth (sampling frequency). A part tied by braces, that is, a part which is multiplied by the waveform scaling factor, the pilot density scaling factor, and the effective signal bandwidth scaling factor and to which the additional bandwidth factor is added, is the Number of Carriers (NoC). The NoC is indicative of a total number of carriers transmitted in a signal bandwidth. In an embodiment of the present invention, as a method using a transmission parameter in order to optimize the effective signal bandwidth of a transmission signal, a parameter is selected in such a way as to optimize transmission efficiency under conditions in which a spectrum mask according to each nation/region is satisfied according to Math Figure 9.

As illustrated in Math Figure 9, in an embodiment of the present invention, each factor may be used as an optimization parameter in order to maximize the effective signal bandwidth based on a spectrum mask according to a channel bandwidth. In particular, at least one of the additional bandwidth factor and/or the waveform transform bandwidth (sampling frequency) may be controlled in order to optimize transmission efficiency of transmission parameters.

The waveform scaling factor is a scaling value according to the bandwidth of a carrier used for waveform transform. In an embodiment, in the case of OFDM, the waveform scaling factor may be set as a specific value proportional to the length of FFT. The pilot density scaling factor is a value set based on the predetermined position of a pilot signal that is inserted by a pilot signal insertion module or a PAPR reduction module and is a specific value set depending on the density of the pilot signal. The value of a pilot pattern part to be described later may be used as the waveform scaling factor and the pilot density scaling factor. In this specification, each of the factors may also be called as a parameter.

The effective signal bandwidth scaling factor is a specific value that may be set in order to satisfy the criterion of a spectrum mask within a transmission channel bandwidth and maximize the band of a transmission signal. The effective signal bandwidth scaling factor may optimize the effective signal bandwidth. The additional bandwidth factor may be set as a specific value in order to control additional information and structure necessary for a signal bandwidth. Furthermore, the additional bandwidth factor may be used to improve channel estimation performance in a spectrum edge by inserting a pilot signal if needed. The additional bandwidth factor may be adjusted by adding the number of specific carriers.

The waveform transform bandwidth may be used as a transmission parameter capable of additionally optimizing the effective signal bandwidth depending on the number of subcarriers used for transmission. The effective signal bandwidth scaling factor may be set as a maximum value with respect to a spectrum mask by extending the effective signal bandwidth scaling factor in a pilot density unit as a predetermined pilot signal. Bandwidth efficiency may be optimized with respect to the conditions of the spectrum mask by additionally controlling the waveform transform bandwidth (sampling frequency) in order to supplement ambiguity that may occur when the effective signal bandwidth scaling factor is extended in a pilot density unit as described above.

Math Figure 9 may be represented as in Math Figure 10 below.

$$eBW = \{N_{waveform\_scaling} \times (N_{pilotdensity} \times N_{eBW}) + \alpha\} \times \Delta f$$
$$(Hz), \Delta f = F_s/N_{FFT} \quad \text{[Math figure 10]}$$

In Math Figure 10, additional factors are used for Math Figure 9.

$\Delta f$ denotes the subcarrier spacing factor, and $N_{FFT}$ denotes the FFT size factor. Unlike in Math Figure 9, in Math Figure 10, bandwidth efficiency optimization may be performed using the subcarrier spacing factor obtained by dividing the waveform transform bandwidth by an FFT size. The effective signal bandwidth may be calculated by multiplying a total number of subcarriers (NoC) by the interval between the subcarriers. In this case, the interval between the subcarriers may be calculated by dividing the waveform transform bandwidth (sampling frequency) by the FFT size.

At least one of 1) The additional bandwidth factor and 2) the waveform transform bandwidth (sampling frequency) are used as the transmission parameters for controlling a signal bandwidth in order to satisfy a different spectrum mask requirement for each nation/region. That is, channel bandwidth and spectrum mask criteria for each nation/region are satisfied and a signal bandwidth is maximized using the two transmission parameter values. In such a method, the transmission signal bandwidth may be controlled using the following method with respect to different limiting conditions (i.e., the channel bandwidth and the spectrum mask) based on a common base mode supported as a common carrier with respect to each FFT mode of a future broadcast system.

1) Efficiency may be maximized by controlling a specific number of carriers with respect to a predetermined sampling frequency through control of the additional bandwidth factor. The number of added carriers may be provided as an additional control signal (or transmission parameter information). The number of carriers adjusted for optimization may be controlled and set within a range in which channel bandwidth and spectrum mask criteria are satisfied. The number of carriers and a signal structure those are controlled will be described later.

2) Transmission efficiency may be optimized by ajdusting a sampling frequency with respect to a predetermined number of common carriers. In this case, a relative ratio of a value designated as a reference for a corresponding sampling frequency or information about a predetermined sampling frequency may also be provided as the additional control signal (the information about the transmission parameter). In such a case, the transmitter may change an effective signal bandwidth by adjusting the sampling frequency and the spacing between the subcarriers. If the effective signal bandwidth is increased by increasing spacing, a transmission signal can be more rapidly transmitted a time viewpoint. That is, transmission efficiency is increased from a time viewpoint.

3) Furthermore, optimization may be performed by controlling both the two transmission parameter values (i.e., the additional bandwidth factor and the waveform transform bandwidth factor). Information about the two transmission parameter values may be provided to the transmission/reception system as the additional control signals as illustrated in FIG. 26.

The additional control signal for transferring parameter values is described below. As described above, the additional control signal is a signal indicative of a transmission parameter that is used for bandwidth optimization. The additional control signal may be used as a value that is mapped or derived as a predetermined value. The additional control signal may also be called an additional signal, a transmission parameter, or transmission parameter information.

First, there is a control code approach. The control code approach is a method of setting each optimized parameter as a control code within limiting conditions, such as a nation/region and a corresponding spectrum mask, and the control code is used as additional information in the transmitter/receiver as described above. In such a method, an additional signal is not transmitted, and the additional control module (e.g., the additional control signal controller of FIG. 26) capable of obtaining information necessary to perform the operation of each module of the transmitter/receiver (e.g., a control code or a corresponding transmission parameter) may perform control and operations. Such a method is advantageous in that additional signaling information is not transmitted. The control code is previously set based on service information supported by a nation, region, and device. If the control code is subsequently changed if needed, hardware or software update may be performed. In this specification, the control code may also be referred as control code information.

A signaling approach is described below. The signaling approach may be applied to a method of optimizing efficiency by adjusting the number of carriers, in particular. Such a method is a method of allocating transmission parameter information for adjusting the number of carriers to a signaling field and is advantageous in that flexibility can be improved although additional information needs to be transmitted. The transmission parameter information may be transmitted in a preamble or in a specific symbol duration subsequent to the preamble which delivers signaling information.

When the transmission parameter information is transmitted in the preamble section, the receiver may obtain a transmission parameter for signaling symbols and data symbols subsequent the preamble by decoding the parameter information of the preamble section. When the transmission parameter information is transmitted through the signaling symbol in a section subsequent to the preamble, the receiver may obtain the transmission parameter for the data symbols by decoding the parameter information of the signaling symbol section. With respect to the signaling symbol, the transmission parameter may be set based on common parameters in a common base mode. With respect to the data symbols subsequent to the signaling symbols, the data symbols may be transmitted using a transmission parameter capable of maximizing transmission efficiency. That is, the signaling symbol part may use a basic transmission parameters that satisfies various conditions, such as a spectrum mask and the data symbol part after the signaling symbol part may use transmission parameters adjusted as described above. Information about the adjusted transmission parameters may be transmitted and received as the signaling symbols. In such a case, a required number of pilots for the interpolation of a time domain may be inserted into the first symbol of the data symbol in order to help channel estimation.

TABLE 34

| Type | NoC | Resolution (32) | Nadd | Inc/Dec sign |
|---|---|---|---|---|
| Common mode | 8K: 6817 | 0 (000) | 8K: 0 | 8K: + |
| | 16K: 13633 | | 16K: 0 | 16K: + |
| | 32K: 27265 | | 32K: 0 | 32K: + |
| DVB 6 MHz | 8K: 6913 | 96 (011) | 8K: 1 | 8K: + |
| | 16K: 13921 | | 16K: 3 | 16K: + |
| | 32K: 27841 | | 32K: 6 | 32K: + |
| Ex) Region A 6 MHz | 8K: 6817 + 64 | 64 (010) | 8K: 1 | 8K: − |
| | 16K: 13633 + 256 | | 16K: 4 | 16K: + |
| | | | 32K: 8 | 32K: + |
| | 32K: 27265 + 1024 | | | |
| Additional control signal bit | | 3 bits | 5 bits | 1 bit |

Table 34 is an embodiment of additional control information or transmission parameter information. The type field denotes the ID number of a network according to a corresponding nation/region and channel bandwidth. The NoC field denotes a total number of transmission carriers. The resolution field denotes the number of added carriers to the NoC in a common mode, the Nadd field denotes the number of added carriers to the NoC of a common base mode in a carrier unit, and the Inc/Dec sign field denotes an increase/decrease of the number of carriers in a common carrier mode.

In the method of setting a control code, a control code corresponding to each type may be previously set in the transmitter/receiver, the value of each type may be obtained, the final NoC may be determined, and the transmitter/receiver may be configured. Alternatively, in order to increase the degree of freedom, each field may be independently selected. In the signaling approach method, corresponding parameters may be derived by sending information about a corresponding type or a corresponding field. The embodiment of Table 34 is an embodiment in which various variable use cases are handled using a total of 9 bits, and other pieces of parameter information may be signaled likewise. In other words, information, such as that of Table 34, may be previously set in the transmitter/receiver as a control code or may be signaled from the transmitter to the receiver.

TABLE 35

| Type | NoC | Resolution (32) | Nadd | Inc/Dec sign | Base Fs |
|---|---|---|---|---|---|
| Common mode | 8K: 6817 | 0 (000) | 8K: 0 | 8K: + | 00: 48/7 |
| | 16K: 13633 | | 16K: 0 | 16K: + | |
| | 32K: 27265 | | 32K: 0 | 32K: + | |
| DVB 6 MHz | 8K: 6813 | 96 (011) | 8K: 1 | 8K: + | 00: 48/7 |
| | 16K: 13921 | | 16K: 3 | 16K: + | |
| | 32K: 27841 | | 32K: 6 | 32K: + | |
| Ex) Region A 6 MHz | 8K: 6817 + 64 | 64 (010) | 8K: 1 | 8K: − | 01: 219/32 |
| | 16K: 13633 + 256 | | 16K: 4 | 16K: + | |
| | | | 32K: 8 | 32K: + | |
| | 32K: 27265 + 1024 | | | | |
| Additional control signal bit | | 3 bits | 5 bits | 1 bit | 2 bits |

Table 35 is an additional embodiment, and it illustrates a waveform transmission bandwidth (sampling frequency) Fs in addition to the information of Table 34. In other words, Table 34 illustrates information for setting/signaling parameters corresponding to the embodiment of the method of controlling the additional bandwidth factor, and Table 35 illustrates information for setting/signaling parameters corresponding to the embodiment of the method of controlling both the additional bandwidth factor and the waveform transmission bandwidth (sampling frequency) factor. The transmission parameter of Table 35 may also be previously set in the transmitter/receiver as control code or may be signaled from the transmitter to the receiver. In Table 35, 2 bits are additionally used compared to Table 34. Table 35 further illustrates a sampling frequency parameter controlled by adding the Base FS field compared to Table 34.

The number of bits allocated in Table 34 and Table 35 may be controlled by taking system complexity and efficiency into consideration, for example.

FIG. 28 is a diagram illustrating an OFDM generation module in accordance with an embodiment of the present invention.

The OFDM generation module of FIG. 28 is an additional embodiment of the OFDM generation module illustrated in FIG. 8. The description of the modules and blocks illustrated in and described with reference to FIG. 8 is not redundantly given. FIG. 28 illustrates in more detail parts of the transmission parameter control module of FIG. 26, which control the OFDM generation module. A waveform processing module 28040 controls a transmission waveform by incorporating characteristics, such as out-of-emission, into the transmission waveform and operates like a pulse shaping filter. However, the waveform processing module 28040 may be omitted according to implementations. In an embodiment of the present invention, if a sampling frequency parameter is controlled, the waveform processing module 28040 may be used to shape a waveform according to a spectrum mask.

In FIG. 28, an additional control signal generation module 28010 may generate an additional control signal and may apply and set a adjusted transmission parameter to and in lower modules associated with the additional control signal generation module 28010 based on corresponding value. A data stream received through a frame builder may be input in a common carrier mode. The additional control signal generation module 28010 may control additional bandwidth factors in the OFDM generation module of FIG. 28.

1) If an additional bandwidth factor is adjusted, the transmitter may allocate data based on a total number of carriers that has been adjusted as a predetermined value by using a pilot and reserved tone insertion module 28020 and an IFFT module 28030. Furthermore, the transmitter may change a pilot structure, for example, by inserting a pilot with the same pilot density as that of a common carrier mode based on a adjusted bandwidth or by inserting a pilot with a different pilot density or inserting an additional pilot according to circumstances. The determined transmission parameter may be inserted into a preamble or signaling field and transmitted as described above.

2) If a waveform transform bandwidth (sampling frequency, Fs) is adjusted, an operation may be performed based on the value of a corresponding sampling rate that is set as a transmission parameter in the waveform processing module 28040 and a DAC module 28050. In this case, the set sampling rate Fs is a value predetermined in the additional control signal generation block 28010, and a value selected according to each mode may be preset in the transmitter. As described above, the waveform processing module 28040 and an operation thereof may be omitted depending on implementations.

Figure 29:
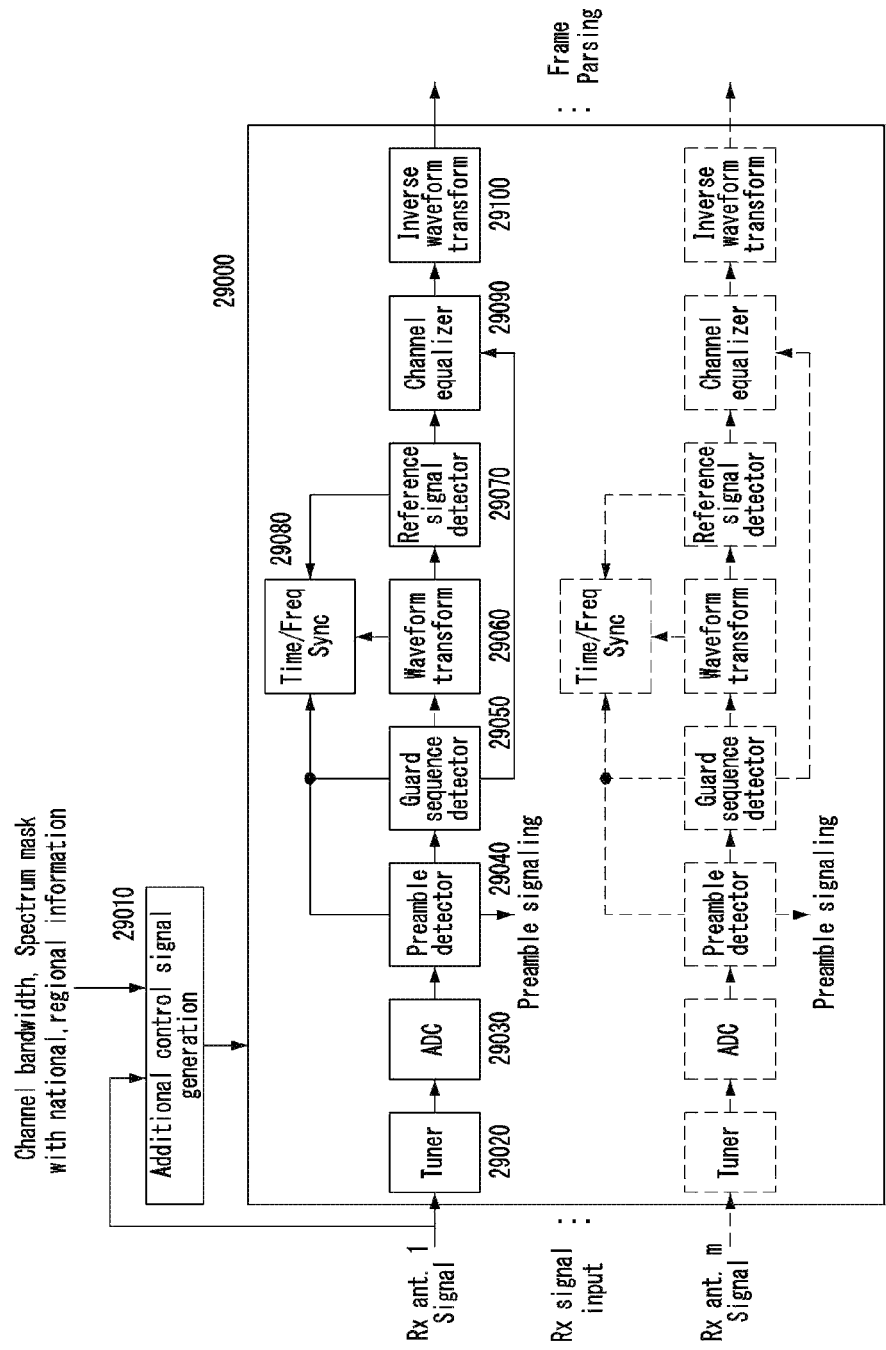
FIG. 29 illustrates a detailed block diagram of the synchronization/demodulation module of the receiver in accordance with an embodiment of the present invention.

FIG. 29 illustrates a detailed block diagram of the synchronization/demodulation module of the receiver in accordance with an embodiment of the present invention.

As illustrated in FIG. 29, a synchronization/demodulation module 29000 may set transmission parameters and demodulate a received signal under the control of an additional control signal generation module 29010. The synchronization/demodulation module 29000 includes a tuner 29020 for tuning a broadcast signal, an ADC module 19030 for converting a received analog signal into a digital signal, a preamble detection module 29040 for detecting a preamble included in the received signal, a guard sequence detection module 29050 for detecting a guard sequence included in the received signal, an FFT module 29060 for performing FFT on the received signal, a pilot signal detection module 29070 for detecting a pilot signal included in the received signal, a time/frequency synchronization module 29080 for performing time/frequency synchronization on the received signal using a preamble and a pilot signal, a channel equalization module 29090 for performing channel equalization using the extracted guard sequence, and an inverse waveform module 29100. The inverse waveform module 29100 is a module for performing transform opposite FFT and may be omitted in some embodiments.

In FIG. 29, signals received by the receiver through a plurality of antennas have been illustrated as being processed through a plurality of paths, the same modules have been illustrated in parallel, and a redundant description of the same module is omitted.

The additional control signal generation module 29010 on the receiver side may set transmission parameters of the receiver. As described above, the additional control signal generation module 29010 may decode a preamble or signaling field and set transmission parameters (e.g., the NoC and pilot information) or may set transmission parameters of the receiver using a control code (transmission parameter) preset in the receiver. The additional control signal generation module 29010 may be included in the signal decoding module 26080 and may operate as described above.

Hereinafter, additional embodiments of the method of adjusting the additional bandwidth factor the waveform transform bandwidth (sampling frequency) are illustrated and described as a method of improving bandwidth use efficiency.

Figure 30A:
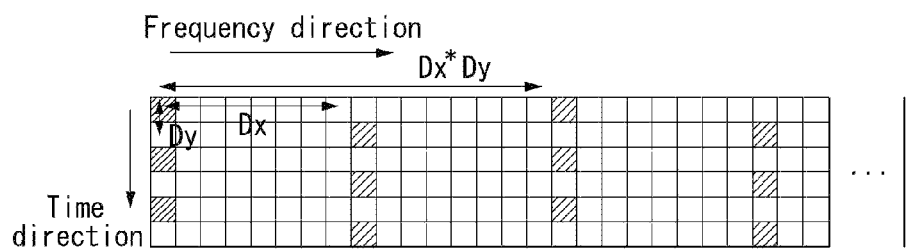
FIGS. 30(a) and 30(b) are conceptual diagrams illustrating a method of adjusting an additional bandwidth factor for improving bandwidth use efficiency in accordance with an embodiment of the present invention.
Figure 30B:
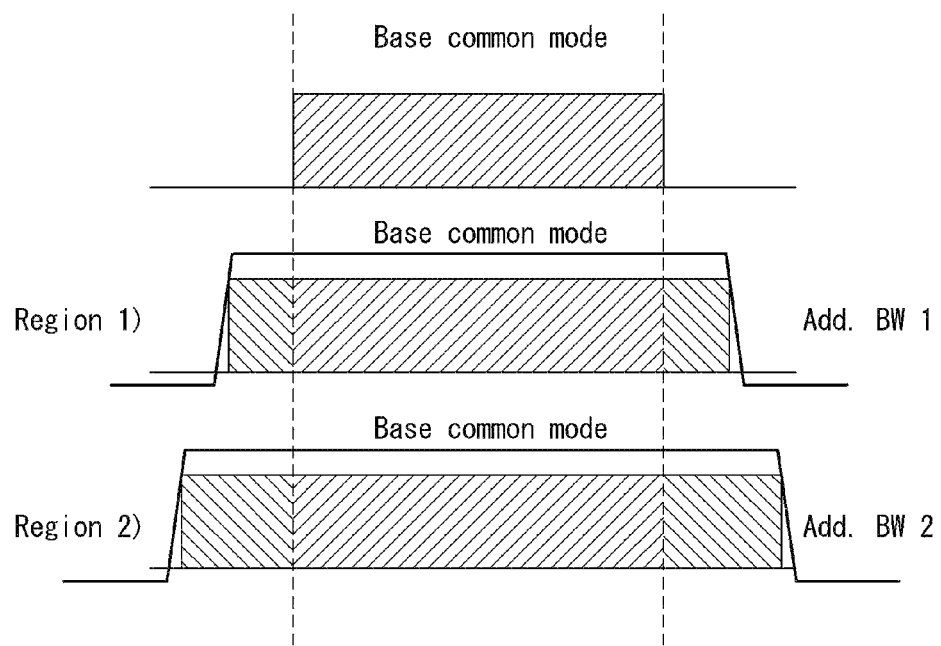

FIG. 30 is a conceptual diagram illustrating a method of adjusting an additional bandwidth factor for improving bandwidth use efficiency in accordance with an embodiment of the present invention.

In FIG. 30(*a*), Dx denotes a pilot density in a frequency direction, Dy denotes a pilot density in a time direction, and Dx*Dy denotes a pilot density.

As illustrated in FIG. 30(*b*), the broadcast system may first use a bandwidth in a base common mode and use an additional bandwidth according to a spectrum mask that may be used for each nation/regions. As illustrated in FIG. 30(*b*), in a region 1), a bandwidth corresponding to an additional bandwidth 1 may be additionally used to the bandwidth of the base common mode. In a region 2), a bandwidth corresponding to an additional bandwidth 2 may be additionally used to the bandwidth of the base common mode.

The additional bandwidth may be set in a Dx unit or Dx*Dy unit and may be controlled by carrier unit for the purpose of fine control. In other words, the transmitter may improve bandwidth usage efficiency by adjusting a total number of subcarriers transmitted within the same time. Such a method is advantageous in that it may be easily managed in the transmitter/receiver because the same waveform transform bandwidth (sampling frequency) is used and only the number of carriers additionally transmitted may be signaled and set.

Figure 31:
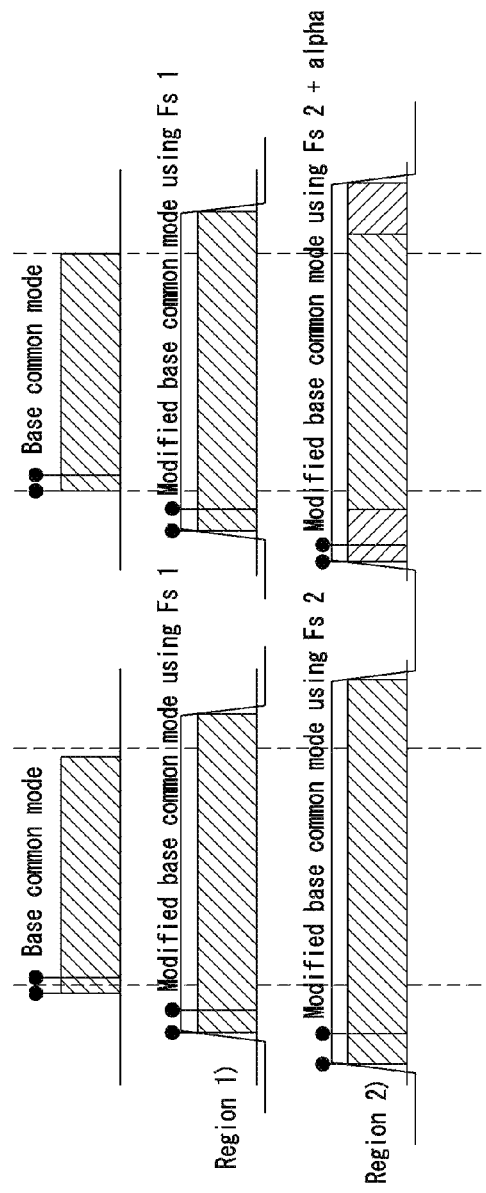
FIG. 31 is a conceptual diagram illustrating a method of controlling a waveform transform bandwidth (sampling frequency) parameter for improving bandwidth use efficiency in accordance with an embodiment of the present invention.

FIG. 31 is a conceptual diagram illustrating a method of controlling a waveform transform bandwidth (sampling frequency) parameter for improving bandwidth use efficiency in accordance with an embodiment of the present invention.

As described above, a waveform transform bandwidth (sampling frequency) Fs may be adjusted so that bandwidth efficiency is optimized according to the spectrum mask criterion of a corresponding nation/region based on a base common mode. Transmission efficiency can be improved because the carrier spacing of subcarriers is changed and a transmission time is adjusted in sending all the subcarriers through the ajdusted Fs.

In FIG. 31, the use bandwidth of a signal can be adjusted by changing a sampling frequency as in Fs1 or Fs2 in a base common mode according to a spectrum mask. Such a method is advantageous in that a different spectrum mask can be easily handled because only Fs is controlled while the same number of subcarriers is used and thus a baseband parameter is not modified in controlling efficiency. The changed Fs may be provided to the transmitter/receiver using a control code. If the changed Fs is signaled, the receiver needs to detect and obtain the corresponding Fs. As illustrated in FIG. 31, the transmitter may adjust a sampling frequency as Fs1 in the case of the region 1 and may adjust a sampling frequency as Fs2 in the case of the region 2. Furthermore, in the case of the region 2, the sampling frequency may be adjusted as Fs2 and an additional bandwidth a may be also added as illustrated in a figure on the right side of FIG. 31.

FIGS. 30 and 31 have illustrated the methods of adjusting an additional bandwidth and a waveform transform bandwidth (sampling frequency) as transmission parameters. As illustrated in the figure on the right side of FIG. 31, in the case of the region 2, an additional bandwidth factor and a waveform transform bandwidth (sampling frequency) may be together adjusted and applied. In such a case, the two transmission parameters should be set as a control code or signaled.

The method of adjusting an additional bandwidth factor is described in more detail in addition to the method of FIG. 30.

Although an additional bandwidth factor is used, in order to maintain an advantage of the simplified operation of a frame builder and a frame parser and to identically maintain the effective power of a data carrier per symbol, a system capable of maintaining a specific Number of Active carriers (NoA) may be used. To this end, a basic structure of the base common mode may be first defined. Furthermore, a data carrier and a pilot structure may be defined based on a mode predetermined for each FFT transmission mode. In other words, the base common mode is a mode, that is, the reference of the addition and reduction of a bandwidth for each spectrum mask. The transmission parameter and structure of the base common mode includes the number of data carriers according to an FFT size, the structure of scattered pilots for channel estimation, the structure of a continual pilot for synchronization estimation, and the structure of a reserved carrier for a PAPR.

With respect to scattered pilots, pilots for estimating a transmission channel are regularly disposed in time and frequency domains. A continual pilot may be overlapped with a scattered pilot or may not be overlapped with a scattered pilot according to its position. All the continual pilots are disposed in a part of a spectrum within the base common mode other than both ends of the spectrum and are distributed randomly and relatively evenly. The reason why both ends are excluded is to prevent the characteristics of the continual pilots from being deteriorated although the number of carriers is reduced in controlling the number of carriers optimized for a spectrum mask and thus to prevent the influence of the tuner and the bandpass filter.

TABLE 36

| | N of mod (N of SP-bearing CPs, Dy) |
|---|---|
| Dy = 2 | 1 |
| Dy = 4 | 3 |
| Dy = 8 | 7 |

The value of modulo operation of Dy, that is, the distance between pilots in a time domain is determined to be Dy−1 in order to meet a specific NoA, and the number of SP-bearing CPs is indicative of a required number in Table 36. The number of active data carriers (NoA) per symbol is regularly set in the base common mode because an edge pilot and a reserved carrier are included.

Figure 32:
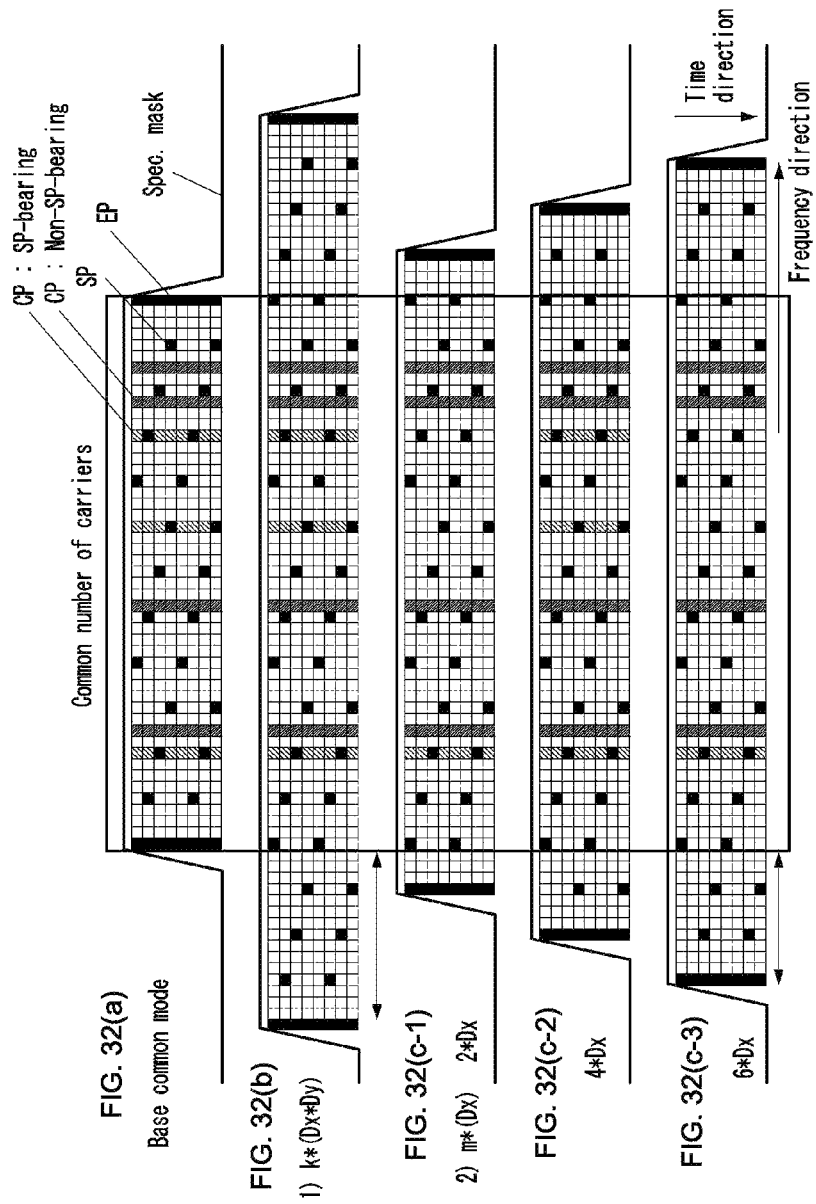

FIG. 32 illustrates a method of extending a bandwidth based on the base common mode while maintaining the NoA per symbol in accordance with an embodiment of the present invention.

In FIG. 32, the figure of each signal bandwidth illustrates the number of added carriers and a pilot structure in a block unit of additional bandwidths added/reduced according to a spectrum mask. In other words, FIG. 32 illustrates the number of carriers and the pilot structures in a block unit of (Dx*Dy) and in a block unit of Dx that are added as additional bandwidths along with the signal structures of the base common mode.

As illustrated in FIG. 32(*a*), in the common base mode, the number of carriers predetermined with respect to a corresponding FFT size and the structure of pilots, such as an SP, a CP, and an EP, have been determined. In a transmission signal of FIG. 32(*a*), an SP has a structure of Dx=4, Dy=4, and a CP includes a non-SP-bearing CP and a SP-bearing CP and includes the number of pilots that are necessary to maintain a specific NoA and that are SP-bearing CPs or specific additional pilots. Embodiments in which the carriers of an additional bandwidth are extended in a pilot density unit and a pilot distance unit in a frequency direction are described below.

FIG. 32(*b*): a k*(Dx*Dy) unit, wherein k is a specific integer.

A method of controlling the number of carriers added to an additional bandwidth in a pilot density unit of (Dx*Dy) is advantageous in that a transmission signal can be optimized for a spectrum mask without modifying and changing a pilot structure (in particular, CP).

If carriers are added or removed from the base common mode so that they correspond to an integer number of a (Dx*Dy) unit corresponding to a pilot density, there is no change in the structure of SP positions, such as the start and end, because a (Dx*Dy) size corresponds to a basic block that forms a pilot with respect to the SP of an added region. Furthermore, in the case of CP, a new signal structure/ system including carriers to which a k*(Dx*Dy) unit has been added may be used without change using a pattern defined in a base common mode.

Accordingly, the receiver may obtain information, such as a total number of carriers and the start position of a base common mode, as parameters optimized for different spectrum masks using transmission parameters indicated by the aforementioned signaling or control code. The offset of the base common mode is started from an offset of k/2*(Dx*Dy) if an integer number k is an even number and is started from i) an offset of (k−1)/2*(Dx*Dy) if the left of a spectrum is first added according to predetermined order and ii) an offset of (k+1)/2*(Dx*Dy) if the right of the spectrum is first added according to predetermined order, if an integer number k is an odd number.

FIG. 32(*c*-1~3): an m*Dx unit, wherein m is a specific integer

The method of FIG. 32(*b*) may be disadvantageous in that a unit of the number of carriers managed and added as an integer number of (Dx*Dy) becomes large. In order to overcome such a disadvantage, there is proposed a method of adding the number of carriers in a Dx unit. The addition of a Dx unit is advantageous in that channel estimation is not greatly affected and fine granularity becomes uniform because time interpolation is first applied in an interpolation process and thus the distance between pilots becomes uniform in a frequency domain.

Regularity may be maintained in such a manner that scattered pilots maintain a consecutive SP position rule with respect to an added carrier region, and an edge pilot present in a base common mode may be located at both ends of a spectrum in the added carrier region.

In this case, the carriers of a Dx unit needs to be selectively controlled according to an SP-bearing CP within a base common mode or an integer number of Dx added to a specific pilot in maintaining the NoA per symbol. In this case, the SP-bearing CP (or specific pilot) requires the number of (Dy−1)-mod(m,Dy). A combination predetermined with respect to an integer of a corresponding m of the SP-bearing CP (or specific pilot) may be selectively selected. For a more simplified system operation, the number of (Dy−1)-mod(m,Dy) may be selectively determined with respect to the integer m in a table predetermined with respect to (Dy−1) pilots required for Dy in the corresponding pilot in order to meet a specific NoA.

Ex) If a Dx unit is added in a spectrum from the left with respect to Dx=4, Dy=4, from among three SP shift positions,
  a. +1*Dx→select a table overlapped with the modulo positions of a $1^{st}$ SP shift (Dx=4) and a $2^{nd}$ SP shift (Dx=8)
  b. +2*DX→select a table overlapped with the modulo position of a $2^{nd}$ SP shift (Dx=8)
  c. +3*DX→select a table overlapped with the modulo positions of a $1^{st}$ SP shift (Dx=4), a $2^{nd}$ SP shift (Dx=8), and a 3nd SP shift (Dx=12)

In this case, a specific number that may maintain the NoA is inserted into the SP-bearing CP (or specific pilot). The number and position of required SP-bearing CPs may be selected from a table set of predetermined SP-bearing CPs and controlled depending on an added additional bandwidth.

TABLE 37

| M | $1^{st}$ shift | $2^{nd}$ shift | $3^{rd}$ shift | Start position |
|---|---|---|---|---|
| 1 | 0 | 0 | Add | $3^{rd}$ shift (3 * Dx = 12) |
| 2 | Add | 0 | Add | $3^{rd}$ shift (3 * Dx = 12) |
| 3 | Add | Add | Add | $2^{nd}$ shift (2 * Dx = 8) |
| 4 | 0 | 0 | 0 | $2^{nd}$ shift (2 * Dx = 8) |
| 5 | 0 | 0 | Add | $1^{st}$ shift (1 * Dx = 4) |
| 6 | Add | 0 | Add | $1^{st}$ shift (1 * Dx = 4) |
| 7 | Add | Add | Add | $0^{th}$ shift (0 * Dx = 0) |
| 8 | 0 | 0 | 0 | $0^{th}$ shift (0 * Dx = 0) |
|  |  |  |  | Dx* (Dv-ceiling(m/s)) |

Table 37 is an embodiment of the table and start positions of SP-bearing CPs selected with respect to the shifting table of an SP-bearing CP (or specific pilot) necessary to meet a specific NoA when the number of carriers of a Dx unit, such as FIG. 32(c-1~3), is controlled.

For example, in a method of selecting an SP-bearing CP table and the start position of an SP controlled when an integer number of m is added with respect to Dx=4, Dy=4, when each shift position table of the SP-bearing CP is selected, the remainder other than a shift block including added Dx is enabled, and the start position of the SP is determined to be Dx*(Dy-ceiling(m/2)). (ceiling( ) is raised)

If m is 1, a CP position overlapped with the $1^{st}$ and $2^{nd}$ shifted SPs other than a $3^{rd}$ shifted SP in the shifting table is selected and transmitted and received because a Dx block including the $3^{rd}$ shifted SP is added if filling is first performed from the left. Likewise, if m is 2, only a CP position overlapped with the $2^{nd}$ shifted SP other than the $3^{rd}$ and $1^{st}$ shifted SPs in the shifting table are transmitted and received because a Dx block including the $3^{rd}$ and $1^{st}$ shifted SPs is added. If m is a multiple of 4, all the control sets of SP-bearing CPs set in the base common mode have only to be selected because all the cases are added in the same number.

The positions of the carriers of SP within each OFDM symbol are changed according to the pilot pattern of a Scattered Pilots (SP) based on the base common mode.

SP inserted into each symbol are inserted in a pilot density unit. The start position of the SP is shifted in a Dx unit as the index of an OFDM symbol is increased. Accordingly, after the symbols of Dy elapse, a repetitive structure appears again. As described above, the start position of each SP position is different in each OFDM symbol of Dy.

A $0^{th}$ shift pattern refers to a pattern in which an SP is started from the first start position. A $1^{st}$ shift pattern refers to a pattern in which an SP is started from a position shifted by 1*Dx with respect to a $0^{th}$ shift pattern. Likewise, in a $(Dy-1)4^{th}$ shift pattern, the start position is shifted by (Dy−1)*Dx and a pilot is positioned.

When an SP-bearing CP is inserted in order to maintain a specific NoA according to an additional bandwidth, the value of an SP bearing CP required for the table of preset SP-bearing CPs may be selected and transmitted according to an added number (i.e., an integer number of Dx).

Different Dx and Dy may be controlled and applied in the same concept as in the aforementioned embodiment.

Figure 33:
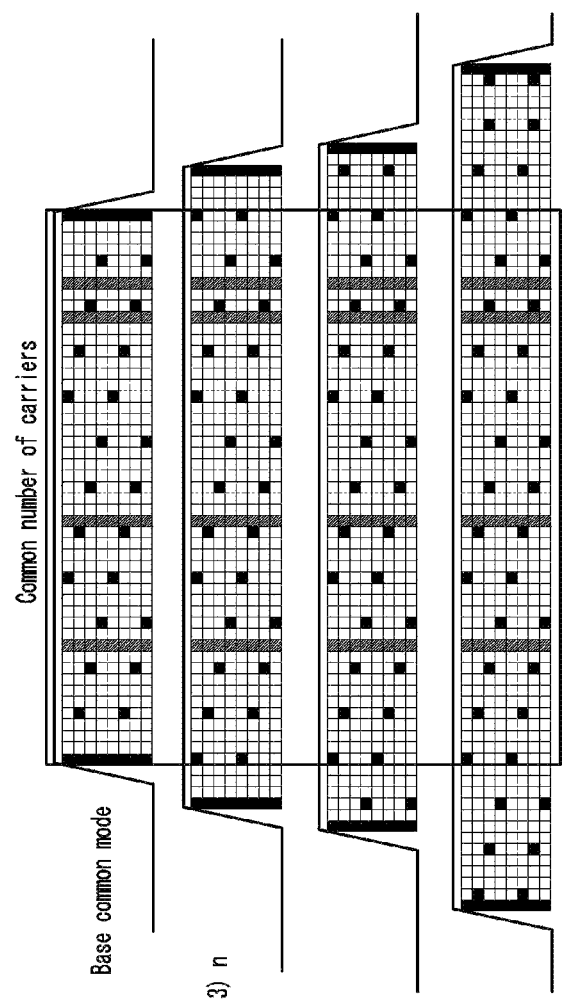
FIG. 33 illustrates another method of extending a bandwidth based on a base common mode without maintaining the NoA per symbol in accordance with an embodiment of the present invention.

FIG. 33 illustrates another method of extending a bandwidth based on a base common mode without maintaining the NoA per symbol in accordance with an embodiment of the present invention.

In FIG. 33, the figure of each signal bandwidth illustrates the number of added carriers and a pilot structure according to a block unit of an additional bandwidth added according to a spectrum mask.

FIG. 33 illustrates a method of adjusting an additional bandwidth and a method of adding/deleting a specific n number of carriers in order to satisfy a spectrum mask based on a base common mode, that is, a method of not maintaining a specific NoA. There is no constraint to a CP because there is no requirement for a specific NoA, but the characteristics of an added/deleted CP are slightly changed according to a spectrum mask. Accordingly, scheduling corresponding to an irregular NoA is required for a frame builder/parser.

Furthermore, control is performed so that an edge pilot is positioned at both edges of an added carrier, but channel estimation performance may be slightly deteriorated because the arrangement of pilots in a frequency domain subjected to time interpolation according to an added amount are not regular at both ends.

In the above method, when a base common mode is set, an SP-bearing CP (or specific pilot) does not need to be set in order to meet the NoA. Accordingly, a CP may be set as a non-SP-bearing CP, if needed, and may be designed so that it has a sufficient degree of freedom.

An embodiment of a method of signaling a set transmission parameter, that is, a method of maximizing an effective bandwidth, is additionally described below.

FIG. 34 is a diagram illustrating a method of signaling a transmission parameter in accordance with an embodiment of the present invention.

An additional control signal is a signal indicative of a transmission parameter for maximizing an effective bandwidth and may be mapped and derived as a predetermined value as described above. Such a transmission parameter may be set in the transmitter/receiver according to the control code approach or the signaling approach as described above.

The signaling approach is a method of allocating transmission parameter information to a signaling field, sending the signaling field, and transferring the signaling field to the transmitter/receiver. The signaling approach is advantageous in that it can increase flexibility in system operations although additional information needs to be transmitted and received. Corresponding parameter information may be transmitted in a preamble or a specific section of symbols in which physical signaling data (PLS) are transmitted after the preamble.

FIG. 34(a) illustrates a method of signaling transmission parameter information through a preamble. If a transmission parameter is transmitted in a preamble, the transmission parameter obtained through the preamble may be decoded and adapted to signaling symbols and data symbols subsequent to the preamble. Accordingly, an NoC having bandwidth efficiency optimized may be used for all the PLS symbols and data symbols transmitted after the preamble.

FIG. 34(b) illustrates a method of signaling transmission parameter information using signaling symbols subsequent to a preamble, that is, PLS. If a transmission parameter is transmitted in PLS symbols, the part of the PLS symbols needs to be transmitted as a bandwidth of a base common mode. In this case, since the transmission parameter is obtained from the PLS symbol and processed, the transmission parameter may be transmitted as an NoC having efficiency maximized in response to a spectrum mask requirement, with respect to data symbols. In such a case, if the NoC of the data symbols is greater than that of the PLS symbol, a) pilot may be extended and transmitted in the outskirt region of the bandwidth of the PLS symbol transmitted in the base common mode in order to improve channel estimation performance or b) a pilot having the role of a frame starting symbol with respect to the first symbol of the data symbol may be inserted into the outskirt region of the bandwidth of the PLS symbol transmitted in the base common mode.

In addition to the aforementioned methods, an embodiment of the method of signaling transmission parameter information may include:

1) a method of dividing a category into 4 categories, directly allocating field values, such as carrier mode0 (i.e., a base common carrier mode), carrier mode1, carrier mode2, and carrier mode3, to the respective categories, indicating the field values, and applying an NoC to the spectrum mask of each mode, 2) a method of indicating each additional bandwidth extended in an extension unit of a pilot density (Dx*Dy) and an integer number of the extension unit, and 3) a method of setting a maximum pilot density (Dx*Dy) of a network corresponding to each FFT size in the transmitter/receiver and indicating only an additional integer number which is multiplied to the extension unit.

FIG. 35 is a diagram illustrating a method of optimizing bandwidth efficiency and a method of signaling a transmission parameter in accordance with an embodiment of the present invention.

Figure 35A:
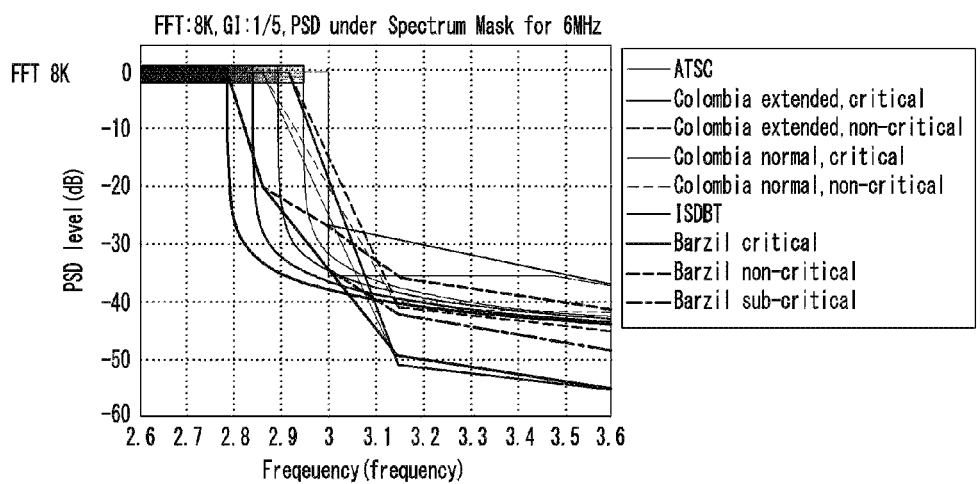
FIGS. 35a, 35b, 35c, and 35d are diagrams illustrating a method of optimizing bandwidth efficiency and a method of signaling a transmission parameter in accordance with an embodiment of the present invention.
Figure 35B:
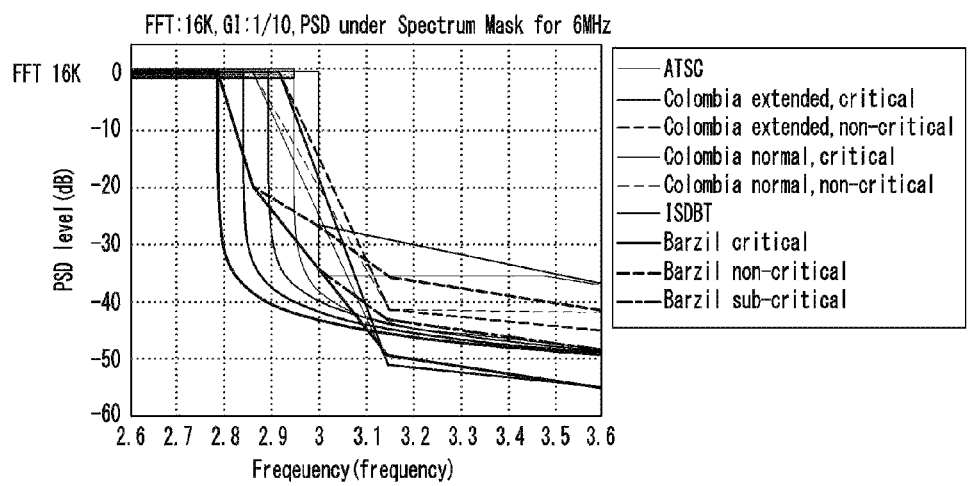
Figures 35C, 35D:
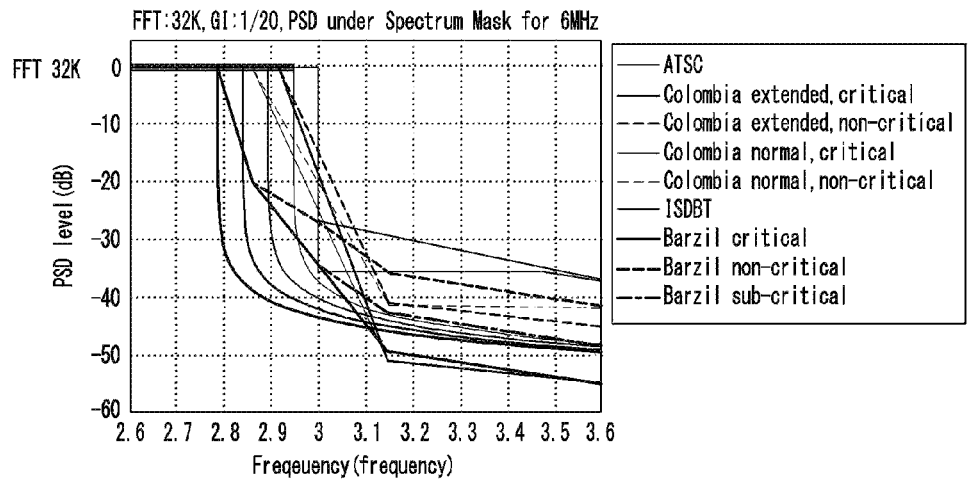

FIG. 35 illustrates a NoC optimized according to a different spectrum mask requirement and a corresponding power spectrum density if a channel bandwidth is 6 MHz. FIG. 35(a) illustrates FFT 8K, FIG. 35(b) illustrates FFT 16K, and FIG. 35(c) illustrates FFT 32K. In the respective cases, bandwidth efficiency may be optimized by controlling an NoC based on the spectrum masks of the regions of ATSC, Colombia (DVB-T2), Japan (ISDB-T), and Brazil (ISDB-T). As described above, the NoC may be selected as a value corresponding to an integer number of the pilot density (Dx*Dy). In the embodiment of FIG. 35, the NoC is selected so that a bandwidth is extended as an integer number of a 128 unit in the case of 8K and as an integer number of a 256 unit in the case of 16K/32 based on a base common mode that satisfies all the spectrum masks. FIGS. 35(a) to 35(c) also illustrate the PSDs of the respective cases.

For example, in FIG. 35(d), the NoC of a base common mod in 16K is 3312 (256*52+256*0+1). In a Colombia (i.e., extended) spectrum mask, the NoC of the base common mode in 16K is extended to 13825 (256*52+256*2+1). In this case, an extended bandwidth is extended by a multiple of 2 of the pilot density (i.e., 256). In each NoC, +1 is indicative of an edge pilot carrier. In FIG. 35(d), an extended NoC in each case is represented by an integer number of a pilot density.

The aforementioned signaling method is described below through an embodiment of NoC control of FIG. 35(d).

1) In a method directly indicated using four carrier modes, 0~3 may be allocated to base common/Brazil, Japan/ATSC, Colombia (normal)/Colombia (extended), respectively.

2) A method of mapping a predetermined value, such as 128 or 256, that is, a unit extended as the pilot density (Dx*Dy), sending the predetermined value in 2 to 3 bits according to a unit, mapping a part corresponding to an integer number to the predetermined value, and sending the predetermined value in 2 to 3 bits according to a unit may be used. For example, the extension unit may be 128: 00, 256: 01, 512: 10, or xx: 11 (future extension), and the extended integer number may be allocated to 0~6 in 3 bits or 0∞3 2 bits and transmitted.

3) Pilot densities, that is, extension units corresponding to respective FFT sizes, may be set in the transmitter/receiver as 8K: 128, 16K: 256, and 32K: 256, respectively, and only 0~6, that is, values corresponding to an extended integer number, may be allocated in 3 bits and signaled. Alternatively, the pilot densities may be set in the transmitter/receiver as 8K: 128, 16K: 256, and 32K: 512, respectively, and only 0~3, that is, values corresponding to an extended integer number, may be allocated in 2 bits and signaled.

The receiver may decode corresponding information using the method, may derive an NoC, and may set parameter information.

Figure 36A:
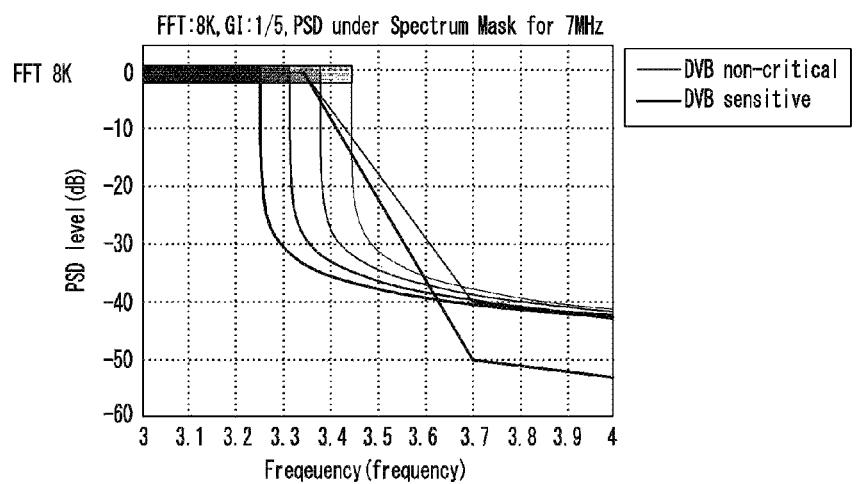
FIGS. 36a, 36b, 36c, and 36d are diagrams illustrating a method of optimizing bandwidth efficiency and a method of signaling transmission parameters in accordance with another embodiment of the present invention.
Figure 36B:
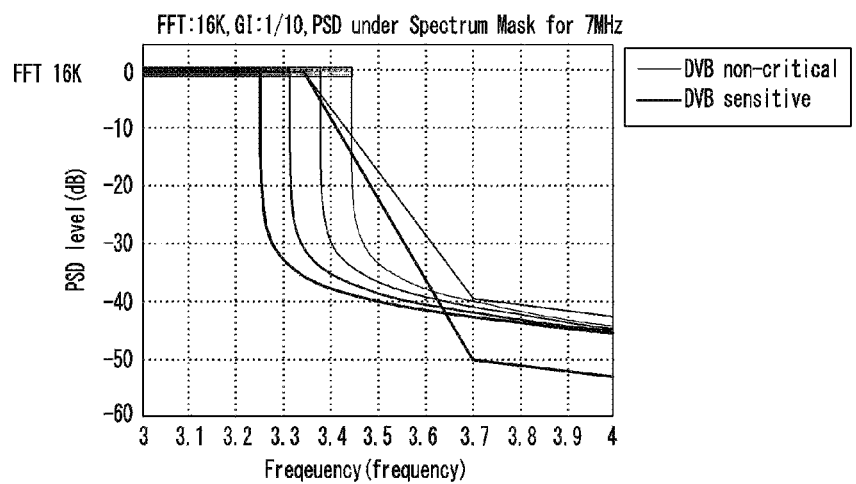

FIG. 36 is a diagram illustrating a method of optimizing bandwidth efficiency and a method of signaling transmission parameters in accordance with another embodiment of the present invention.

Figures 36C, 36D:
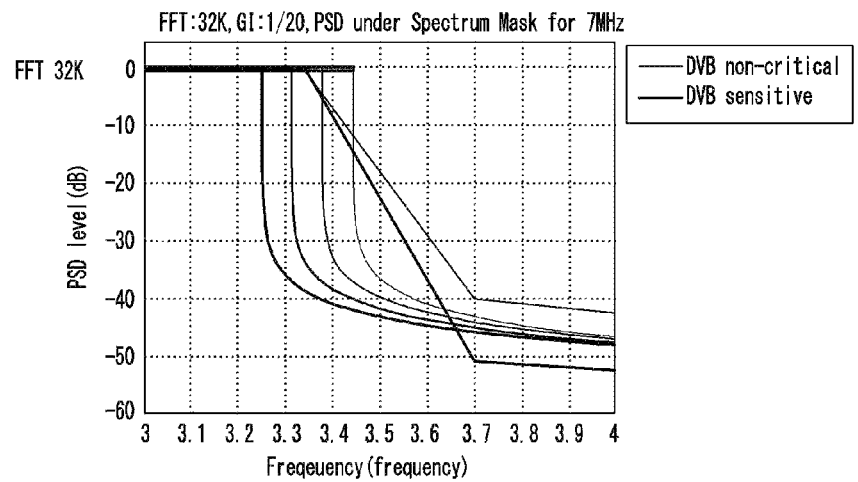

FIG. 36 illustrates an NoC optimized for a DVB spectrum mask requirement if a channel bandwidth is 7 MHz and a corresponding power spectrum density. Control of the NoC and the signaling of the transmission parameters in which the channel bandwidth satisfies the DVB spectrum mask of 7 MHz may be performed in accordance with the method of FIG. 35 using the category of DVB (7M) in FIG. 36(d).

Figure 37:
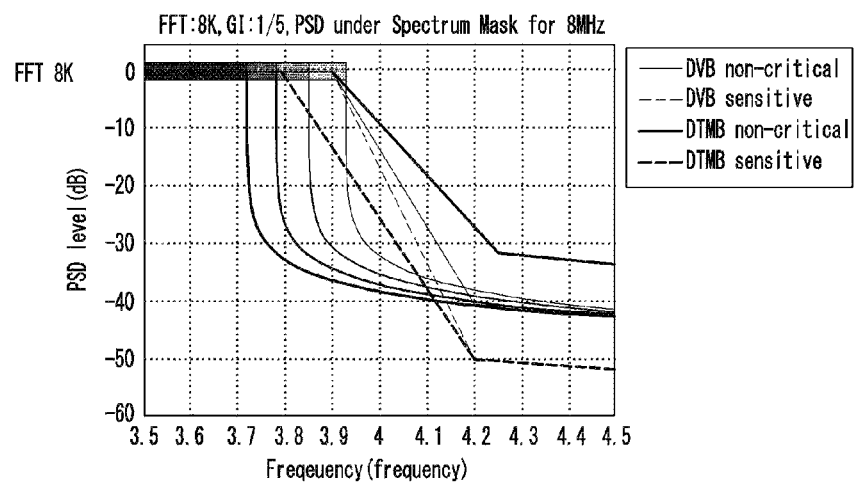
FIGS. 37a, 37b, 37c, and 37d are diagrams illustrating a method of optimizing bandwidth efficiency and a method of signaling transmission parameters in accordance with yet another embodiment of the present invention.
Figure 37B:
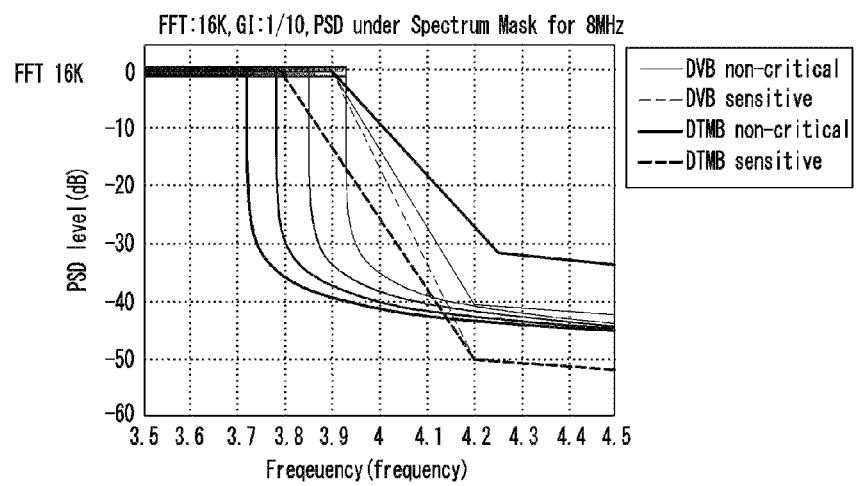

FIG. 37 is a diagram illustrating a method of optimizing bandwidth efficiency and a method of signaling transmission parameters in accordance with yet another embodiment of the present invention.

Figures 37C, 37D:
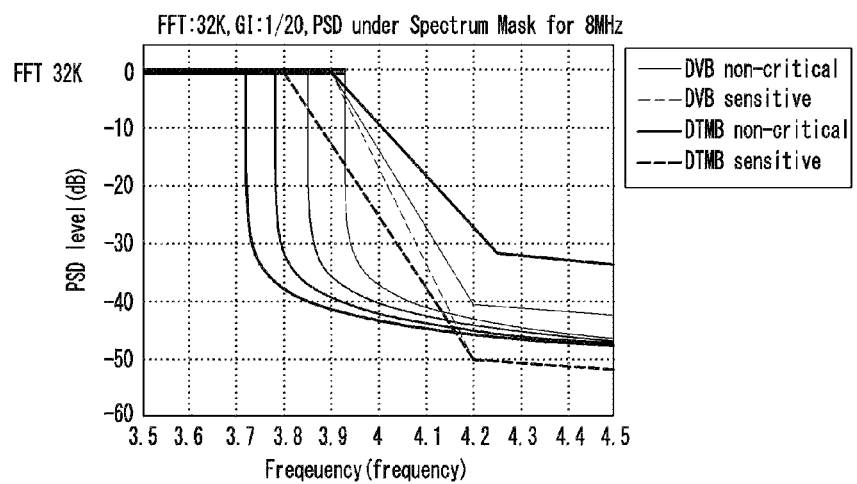

FIG. 37 illustrates an NoC optimized for the spectrum mask requirements of DVB and DTMB (China) if a channel bandwidth is 8 MHz and a corresponding power spectrum density. Control of the NoC and the signaling of the transmission parameter in which the channel bandwidth satisfies the spectrum masks of DVB and DTMB with respect to 8 MHz may be performed in accordance with the method of FIG. 35 using the categories of DVB (8M)/DTMB and critical (8M) and the categories of DVB (8M)/DTMB and non-critical (8M) in FIG. 37(d).

Figure 38:
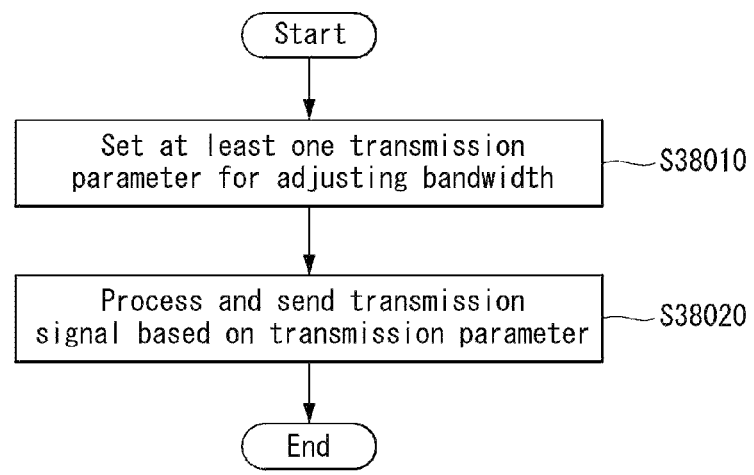
FIG. 38 is a flowchart illustrating a method of processing a broadcast signal so that a bandwidth is adjusted and sending the broadcast signal in accordance with an embodiment of the present invention.

FIG. 38 is a flowchart illustrating a method of processing a broadcast signal so that a bandwidth is adjusted and sending the broadcast signal in accordance with an embodiment of the present invention.

The broadcast transmitter may set at least one transmission parameter for the shifting of a bandwidth at step S38010. Furthermore, the broadcast transmitter may process a transmission signal based on the set transmission parameter and send the transmission signal at step S38020.

The setting of the transmission parameter and the processing of the transmission signal by the broadcast transmitter may be performed as described above in relation to FIGS. 26 to 37. In other words, the transmission parameter control module of the broadcast transmitter may adjust the bandwidth of the transmission signal by adjusting the at least one transmission parameter. The bandwidth of such a transmission signal may be controlled based on the bandwidth of a base common mode, that is, a basis for the control of the bandwidth, according to the bandwidth limit and spectrum mask requirement of each nation/region.

The transmission parameter includes at least one of an additional bandwidth parameter added to the signal bandwidth of the base common mode and the sampling frequency parameter of the transmission signal. The additional bandwidth parameter may be set and signaled as the number of additional carriers.

Such a transmission parameter may be signaled using at least one of the preamble and PLS symbol of the transmission signal or may be set in the broadcast transmitter as a control code. If a transmission parameter is set as a control code, the broadcast transmitter may set the transmission parameter using the control code.

The processing and transmission of the transmission signal by the broadcast transmitter includes the aforementioned input formatting, BICM processing, frame building, and OPFDM generation of the transmission signal as above described. In particular, the broadcast transmitter may control the bandwidth of a transmission signal based on a transmission parameter using the frame building module and the OFDM generation module and may control the pilot structure of the transmission signal based on the controlled bandwidth of the transmission signal.

Figure 39:
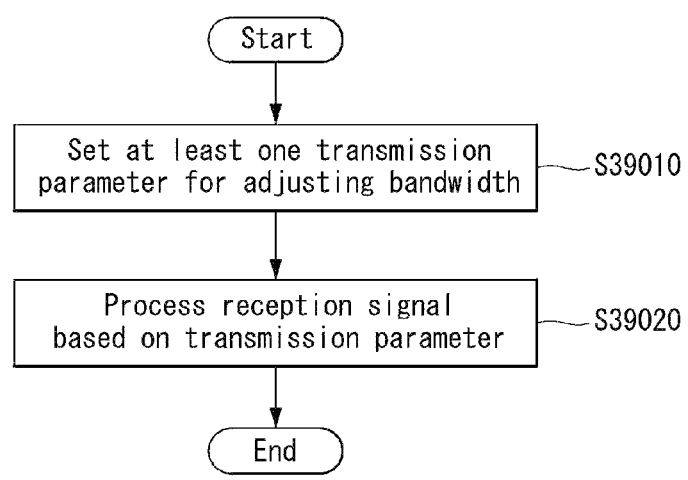
FIG. 39 is a diagram illustrating a method of receiving a broadcast signal having a controlled bandwidth and processing the broadcast signal in accordance with an embodiment of the present invention.

FIG. 39 is a diagram illustrating a method of receiving a broadcast signal having a controlled bandwidth and processing the broadcast signal in accordance with an embodiment of the present invention.

The broadcast receiver may set at least one transmission parameter for adjusting a bandwidth at step S38010. Furthermore, the broadcast transmitter may process a received signal based on the set transmission parameter at step S38020.

The setting of the transmission parameter and the processing of the transmission signal by the broadcast receiver may also be performed as described above in relation to FIGS. 26 to 37. In other words, the transmission parameter control module of the broadcast receiver may adjust the at least one transmission parameter and process the received signal having a adjusted bandwidth. The bandwidth of such a received signal has been controlled based on the bandwidth of a base common mode, that is, a basis for control of the bandwidth, based on the bandwidth limit and spectrum mask requirement of each nation/region.

The transmission parameter may include at least one of an additional bandwidth parameter added to the signal bandwidth of the base common mode and the sampling frequency parameter of the transmission signal. The additional bandwidth parameter may be set and signaled as the number of added carriers.

Such a transmission parameter may be signaled using at least one of the preamble and PLS symbol of the received signal or may be set in the broadcast receiver as a control code. If a transmission parameter is set as a control code, the broadcast receiver may set the transmission parameter using the control code. If the transmission parameter is signaled, the broadcast receiver may extract and decode the transmission parameter included in the preamble or PLS symbol.

The processing of the received signal by the broadcast receiver includes the aforementioned synchronization/demodulation, frame parsing, demapping/decoding, and output processing of the received signal as above described. In particular, the broadcast receiver may process the received signal of a controlled bandwidth and process pilot signals based on the set transmission parameter using the synchronization/demodulation module and the frame parsing module.

FIG. 40 is a diagram illustrating a transmission parameter for the transmission of a broadcast signal in accordance with another embodiment of the present invention.

In the table of FIG. 40, in accordance with an embodiment of the present invention, the baseband sampling rate of a transmission system proposed for a future broadcast system uses the base sampling rate of a DVB system by taking into consideration of compatibility according to each region/nation, and a transmission parameter is optimized based on the base sampling rate. The table of FIG. 40 illustrates combinations of a guard interval, an FFT size, and a pilot pattern proposed according to corresponding channel bandwidths.

In the present embodiment, the number of guard interval samples limits a mode including an integer number of 206 samples. The length of the guard interval is proposed as in the table of FIG. 40 according to a Baseband Sample Rate (BSR) applied to each channel bandwidth (e.g., 6 Mhz, 7 MHz, or 8 MHz). A corresponding guard interval may be supported by taking into consideration fixed/mobile reception in each region using each channel bandwidth and a network configuration, such as an MFN or an SFN.

In particular, the guard interval of the present embodiment is designed to provide each mode for each guard interval as the same number of samples with respect to a different FFT size and channel bandwidth so that the redundancy of signaling is reduced and complexity of the receiver is reduced. Furthermore, in the case of a pilot pattern supporting a corresponding guard interval, a fraction of the guard interval corresponds to a reciprocal number of an integer number value of about 5, and the distance Dx between pilots in a frequency direction for supporting a corresponding guard interval is set based on a multiple of 4. Accordingly, a guard interval versus a maximum channel estimation margin is designed to be about 20%~25%, and an interpolation filter can be designed to have a sufficient margin.

A pilot distance in a time direction is related to the mobility of supported services. In order to support mobility, 8K, 16K mode has a value of Dy=2 and a value of Dy=4 for fixed reception according to the use case of the aforementioned profile. 32K mode is chiefly used in fixed reception, and it supports a value of Dy=2 by taking into consideration the memory constraint of the receiver. A more proper value may be considered to be the value of Dy according to the complexity of a corresponding receiver and the mobility of supported services.

A method of controlling pilot boosting parameters in accordance with another embodiment of the present invention is described below.

The amplitude level of a pilot affects the power of a data carrier within limited transmission power and has a trade-off relationship with a channel estimation gain. Accordingly, the amplitude level of the pilot may be optimized in order to maximize the SNR of the final equalized data cell (carrier).

In other words, a channel estimation gain according to a pilot density and the level of a pilot and a loss of the power of a corresponding data cell may be taken into consideration because the amplitude level of the pilot affects a channel estimation gain and the power of a data cell (carrier). Furthermore, the SNR of EQ output is influenced by the gain of an interpolation filter that is used to obtain the channel values of all the carrier positions, that is, values on which channel estimation has been performed.

In the present embodiment, the interpolation filter uses a noise reduction gain according to linear interpolation as a reference value with respect to a time domain. With respect to a frequency domain, the interpolation filter derives a target interpolation gain with respect to a noise reduction gain according to various channel environments, selects the target interpolation gain as a value of 0.5, and uses the selected interpolation gain as a reference value.

Furthermore, in a future broadcasting system, the amplitudes of pilots need to be individually optimized according to the pilot pattern of each mode because optimized pilots are distributed and disposed in each network. The present embodiment proposes a boosting level of a pilot determined by taking into consideration a frame structure proposed by a future broadcasting system.

Furthermore, the present embodiment proposes parameters according to each SISO/MIMO mode because the pilot density of the MIMO mode is greater than that of the SISO mode.

The present embodiment proposes pilot boosting parameters as follows according to a symbol within each frame.

1) a Frame Signaling Symbol (FSS)/Frame Edge Symbol (FES): they are symbols positioned at both ends of a frame and have dense pilots. A corresponding symbol is designed so that frequency interpolation is independently performed, and the density of a pilot depends on Dx. Accordingly, a pilot amplitude is optimized.

2) A normal data symbol: it is a symbol having the arrangement of pilots of Dx, Dy designed suitably for a network. Time interpolation is performed between symbols, and the pilot density of each symbol is formed of Dx*Dy. Accordingly, a pilot amplitude is optimized.

Pilot boosting parameters determined and proposed by taking into consideration the aforementioned contents are illustrated in FIG. 41.

FIG. 41 illustrates the pilot boosting parameters in accordance with an embodiment of the present invention.

FIG. 41 illustrates the pilot boosting parameters in which the SISO/MIMO methods are taken into consideration according to pilot patterns supported by a broadcast system with respect to a normal data symbol and an FSS/FES.

In FIG. 41, tables of Asp(a) (scattered pilot amplitude) include values optimized for respective pilot patterns.

In FIG. 41, tables of Asp(b) include values in which a pilot amplitude has been selected as a value of an average value with respect to the same pilot density.

In FIG. 41, tables of Asp (c) include values approximated by taking the receiver into consideration and represented as fractions with respect to the values of (a), (b) selected as floating values.

The broadcast signal transmitter may process a transmission signal using the aforementioned pilot boosting parameters through the OFDM generation module. In other words, the broadcast signal transmitter may process a pilot signal using the tables of FIG. 41 and the values included in the tables.

In the specification, methods and apparatuses for receiving and transmitting a broadcast signal are used.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

What is claimed is:

1. An apparatus for receiving a broadcast signal, comprising:
a tuner configured to tune the broadcast signal;
a demodulator configured to demodulate the tuned broadcast signal;
a frame parser configured to parse a signal frame in the broadcast signal based on a Number of Carriers (NOC) of the signal frame and to extract service data,
wherein the signal frame comprises at least one physical layer signaling (PLS) symbol and at least one data symbol, the PLS symbol carrying physical layer signaling data; and
a decoder configured to perform error correction on the extracted service data,
wherein, for a specific Fast Fourier Transform (FFT) size and with a fixed subcarrier spacing for the FFT size, the NoC per symbol of the signal frame is determined as a base NoC or adjusted from the base NoC by a product of an integer value and a control unit value, the control unit value being a specific carrier number for the NoC adjustment,
wherein the NoC is adjusted not only for the data symbol but also for the PLS symbol,
wherein the PLS symbol includes information regarding the NoC which indicates the integer value for a following symbol, and
wherein the PLS symbol has a minimum NoC for the FFT size and the following symbol has an NoC which is indicated by the information.

2. The apparatus of claim 1, wherein the control unit value for the NoC adjustment is determined based on the FFT size.

3. The apparatus of claim 1, wherein the PLS symbol comprises FFT size information indicating the FFT size as 8K, 16K, or 32K.

4. The apparatus of claim 1, wherein a size of the information is 3 bits.

5. The apparatus of claim 1, wherein occupied bandwidth of the broadcast signal is increased when the NoC is increased.

6. The apparatus of claim 1, wherein at least one scattered pilot bearing continual pilot is selectively added according to the determined NoC for maintaining a number of data carriers per symbol.

7. A method for receiving a broadcast signal, comprising:
tuning the broadcast signal;
demodulating the tuned broadcast signal;
parsing a signal frame in the broadcast signal based on a Number of Carriers (NOC) of the signal frame and extracting service data,
wherein the signal frame comprises at least one physical layer signaling (PLS) symbol and at least one data symbol, the PLS symbol carrying physical layer signaling data; and
performing error correction on the extracted service data, wherein, for a specific Fast Fourier Transform (FFT) size and with a fixed subcarrier spacing for the FFT size, the NoC per symbol of the signal frame is determined as a base NoC or adjusted from the base NoC by a product of an integer value and a control unit value, the control unit value being a specific carrier number for the NoC adjustment, wherein the NoC is adjusted not only for the data symbol but also for the PLS symbol, wherein the PLS symbol includes information regarding the NoC which indicates the integer value for a following symbol, and wherein the PLS symbol has a minimum NoC for the FFT size and the following symbol has an NoC which is indicated by the information.

8. The method of claim 7, wherein the unit value for the NoC adjustment is determined based on the FFT size.

9. The method of claim 7, wherein the PLS symbol comprises FFT size information indicating the FFT size as 8K, 16K, or 32K.

10. The method of claim 7, wherein a size of the information is 3 bits.

11. The method of claim 7, wherein occupied bandwidth of the broadcast signal is increased when the NoC is increased.

12. The method of claim 7, wherein at least one scattered pilot bearing continual pilot is selectively added according to the determined NoC for maintaining a number of data carriers per symbol.

* * * * *

UNITED STATES PATENT AND TRADEMARK OFFICE
CERTIFICATE OF CORRECTION

PATENT NO. : 10,158,515 B2  
APPLICATION NO. : 15/477371  
DATED : December 18, 2018  
INVENTOR(S) : Chulkyu Mun et al.

Page 1 of 1

It is certified that error appears in the above-identified patent and that said Letters Patent is hereby corrected as shown below:

In the Claims

Column 54, Line 24, of Claim 1, replace "symbol, the PLS symbol carrying physical layer signaling" with -symbol, the at least one PLS symbol carrying physical layer signaling- Column 54, Line 36, of Claim 1, replace "but also for the PLS symbol" with -but also for the at least one PLS symbol,-

Column 54, Line 37, of Claim 1, replace "wherein the PLS symbol includes information regarding" with -wherein a PLS symbol includes information regarding- Column 54, Line 65, of Claim 7, replace "symbol, the PLS symbol carrying physical layer signaling" with -symbol, the at least one PLS symbol carrying physical layer signaling- Column 55, Line 9, of Claim 7, replace "but also for the PLS symbol," with -but also for the at least one PLS symbol,-

Column 55, Line 10, of Claim 7, replace "wherein the PLS symbol includes information regarding" with -wherein a PLS symbol includes information regarding- Signed and Sealed this  
Eighth Day of March, 2022

Drew Hirshfeld  
*Performing the Functions and Duties of the  
Under Secretary of Commerce for Intellectual Property and  
Director of the United States Patent and Trademark Office*